(12) United States Patent
Robson

(10) Patent No.: US 7,291,936 B1
(45) Date of Patent: Nov. 6, 2007

(54) SUBMERSIBLE ELECTRICAL POWER GENERATING PLANT

(76) Inventor: John H. Robson, 1167 Lomond Dr., Mundelien, IL (US) 60060

( * ) Notice: Subject to any disclaimer, the term of this patent is extended or adjusted under 35 U.S.C. 154(b) by 0 days.

(21) Appl. No.: 11/416,604

(22) Filed: May 3, 2006

(51) Int. Cl.
*H02P 9/04* (2006.01)
*F03D 9/00* (2006.01)
*F03B 13/10* (2006.01)
*F03B 13/12* (2006.01)
*F03B 13/00* (2006.01)

(52) U.S. Cl. .............................. 290/43; 290/53; 290/54

(58) Field of Classification Search .................. 290/43, 290/53–54
See application file for complete search history.

(56) References Cited

U.S. PATENT DOCUMENTS

| | | | | |
|---|---|---|---|---|
| 2,501,696 A | * | 3/1950 | Souczek ....................... | 290/43 |
| 3,973,864 A | | 8/1976 | Atherton ....................... | 415/8 |
| 3,980,894 A | | 9/1976 | Vary et al. ..................... | 290/54 |
| 3,986,787 A | * | 10/1976 | Mouton et al. ................ | 415/7 |
| 4,023,041 A | | 5/1977 | Chappell ....................... | 290/53 |
| 4,025,220 A | | 5/1977 | Thompson et al. ............ | 415/7 |
| 4,038,821 A | | 8/1977 | Black ............................ | 60/398 |
| 4,095,918 A | | 6/1978 | Mouton, Jr. et al. .......... | 415/7 |
| 4,134,710 A | | 1/1979 | Atherton ....................... | 416/117 |
| 4,137,005 A | | 1/1979 | Comstock ..................... | 415/24 |
| 4,163,904 A | | 8/1979 | Skendrovic .................. | 290/54 |
| 4,163,905 A | | 8/1979 | Davison ........................ | 290/54 |
| 4,174,923 A | | 11/1979 | Williamson .................. | 415/211.1 |
| 4,203,702 A | | 5/1980 | Williamson ................... | 415/60 |
| 4,205,943 A | * | 6/1980 | Vauthier ....................... | 416/86 |
| 4,219,303 A | * | 8/1980 | Mouton et al. ................ | 415/7 |
| 4,256,970 A | | 3/1981 | Tomassini ..................... | 290/53 |
| 4,306,157 A | | 12/1981 | Wracsaricht ................. | 290/54 |
| 4,335,319 A | | 6/1982 | Mettersheimer ............... | 290/54 |
| 4,383,182 A | * | 5/1983 | Bowley ........................ | 290/43 |
| 4,467,218 A | | 8/1984 | Andruszkiw et al. .......... | 290/54 |
| 4,520,273 A | | 5/1985 | Rowe ............................ | 290/54 |
| 4,551,066 A | | 11/1985 | Frisz ............................. | 416/119 |
| 4,613,279 A | * | 9/1986 | Corren et al. ............... | 415/121.2 |
| 4,643,249 A | | 2/1987 | Grawey ........................ | 165/159 |
| 4,684,817 A | | 8/1987 | Goldwater .................... | 290/55 |
| 4,748,808 A | * | 6/1988 | Hill ............................... | 60/398 |
| 4,818,888 A | | 4/1989 | Lenoir, III .................... | 290/43 |
| 4,843,249 A | * | 6/1989 | Bussiere ........................ | 290/53 |
| 4,850,190 A | * | 7/1989 | Pitts .............................. | 60/398 |
| 5,266,006 A | | 11/1993 | Tsui et al. ..................... | 416/119 |

(Continued)

*Primary Examiner*—Julio Gonzalez
*Assistant Examiner*—Pedro J. Cuevas
(74) *Attorney, Agent, or Firm*—Meroni & Meroni, P.C.; Charles F. Meroni, Jr.; Christopher J. Scott

(57) ABSTRACT

A self-supporting, submersible generating plant for producing electricity from ocean currents, consisting of two counter-rotating, rear-facing turbines with a plurality of rotor blades extending radially outward from two separate horizontal axis that convey the kinetic energy from the two side-by-side, counter-rotating turbine rotors through separate gearboxes to separate generators that are housed in two watertight nacelles that are located sufficiently far apart to provide clearance for the turbine rotors. The two generators and their gearboxes serve as ballast and are located far below a streamlined buoyancy tank that extends fore and aft above and between them. A combination of a leverage system and a pressure-controlled system adjusts the hydrodynamic lifting forces to maintain constant depths. There are systems to purge the ballast water to facilitate the recovery of both individual submersible power plants and a group of many submersible power plants.

6 Claims, 16 Drawing Sheets

U.S. PATENT DOCUMENTS

| | | |
|---|---|---|
| 5,440,176 A * | 8/1995 | Haining ........................ 290/54 |
| 5,592,895 A * | 1/1997 | Schmidt ..................... 114/274 |
| 5,798,572 A * | 8/1998 | Lehoczky .................... 290/54 |
| 5,834,853 A | 11/1998 | Ruiz et al. ..................... 290/54 |
| 5,937,644 A | 8/1999 | Dipmall ........................ 60/398 |
| 6,006,518 A | 12/1999 | Geary .......................... 60/398 |
| 6,064,123 A | 5/2000 | Gislason ....................... 290/55 |
| 6,091,161 A * | 7/2000 | Dehlsen et al. ............... 290/43 |
| 6,104,097 A * | 8/2000 | Lehoczky .................... 290/54 |
| 6,168,373 B1 * | 1/2001 | Vauthier ........................ 415/7 |
| 6,305,309 B1 * | 10/2001 | Ead et al. ................... 114/245 |
| 6,531,788 B2 | 3/2003 | Robson ........................ 290/43 |
| 6,598,554 B1 * | 7/2003 | Lasky et al. ................ 114/245 |
| 6,712,559 B2 * | 3/2004 | Lenormand et al. ..... 405/224.2 |
| 6,789,490 B2 * | 9/2004 | Schmidt .................. 114/61.12 |
| 6,856,036 B2 * | 2/2005 | Belinsky ...................... 290/42 |
| 6,955,049 B2 * | 10/2005 | Krouse ...................... 60/641.7 |
| 7,075,189 B2 * | 7/2006 | Heronemus et al. .......... 290/44 |
| 7,101,117 B1 * | 9/2006 | Chow ........................ 405/201 |
| 7,105,942 B2 * | 9/2006 | Henriksen .................... 290/55 |
| 7,199,484 B2 * | 4/2007 | Brashears .................... 290/54 |
| 7,215,036 B1 * | 5/2007 | Gehring ....................... 290/54 |
| 2002/0152941 A1 * | 10/2002 | Kay ....................... 114/61.16 |
| 2003/0099516 A1 * | 5/2003 | Chow ..................... 405/195.1 |
| 2003/0154896 A1 * | 8/2003 | Schmidt .................. 114/61.12 |
| 2003/0168864 A1 * | 9/2003 | Heronemus et al. .......... 290/55 |
| 2005/0005464 A1 * | 1/2005 | Wilkinson et al. ........ 33/355 R |
| 2006/0090572 A1 * | 5/2006 | Berkovitch ................ 73/861.79 |
| 2006/0171798 A1 * | 8/2006 | Yamamoto et al. .......... 415/4.5 |
| 2006/0280034 A1 * | 12/2006 | Howard ...................... 367/134 |
| 2007/0046028 A1 * | 3/2007 | Gizara ......................... 290/54 |
| 2007/0096472 A1 * | 5/2007 | Mondl ......................... 290/54 |

* cited by examiner

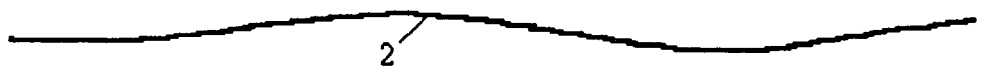
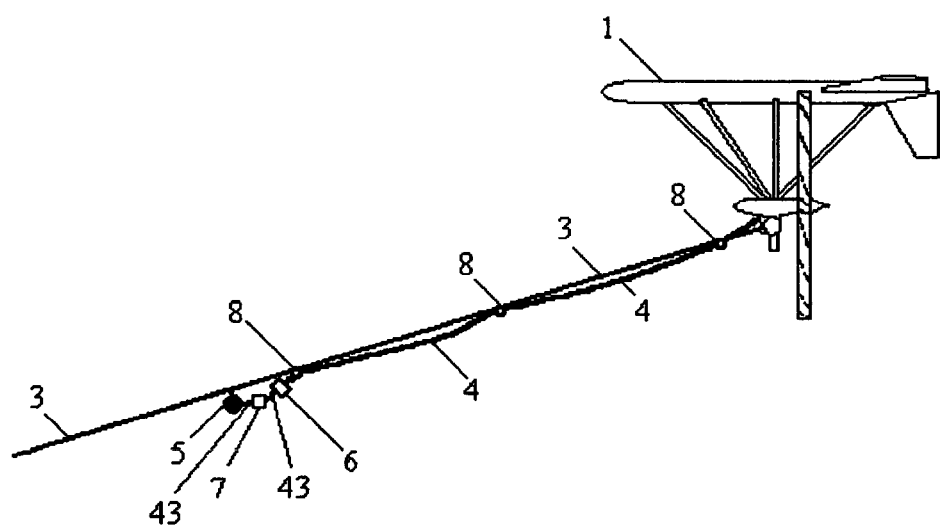
Fig. 1

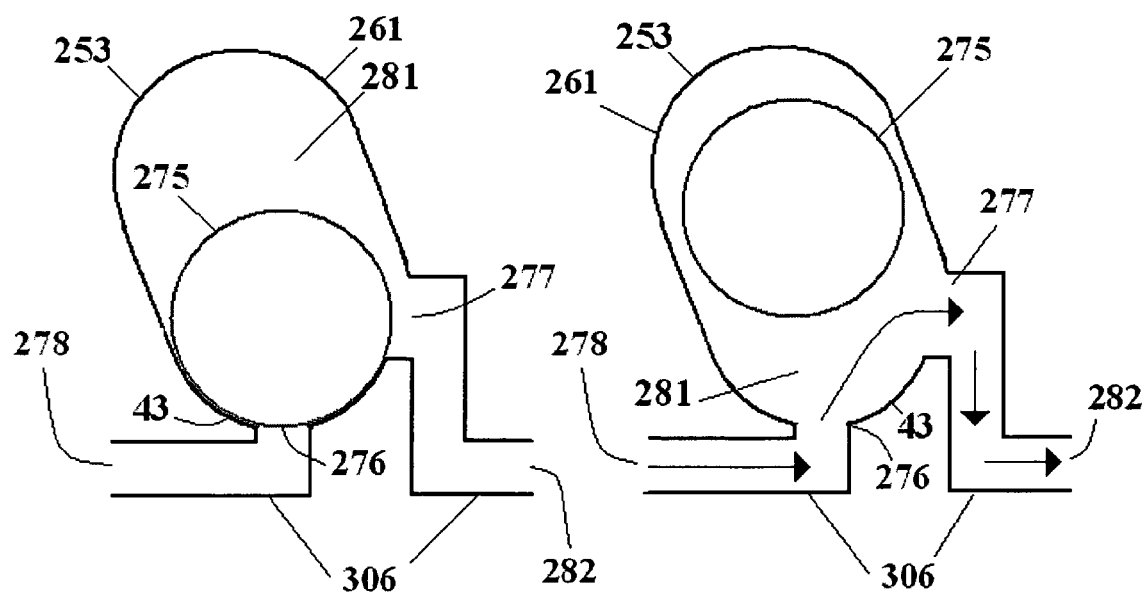
Fig. 12a   Fig. 12b

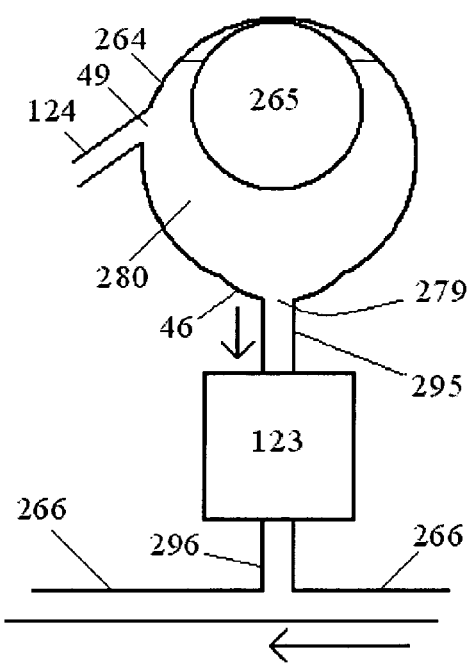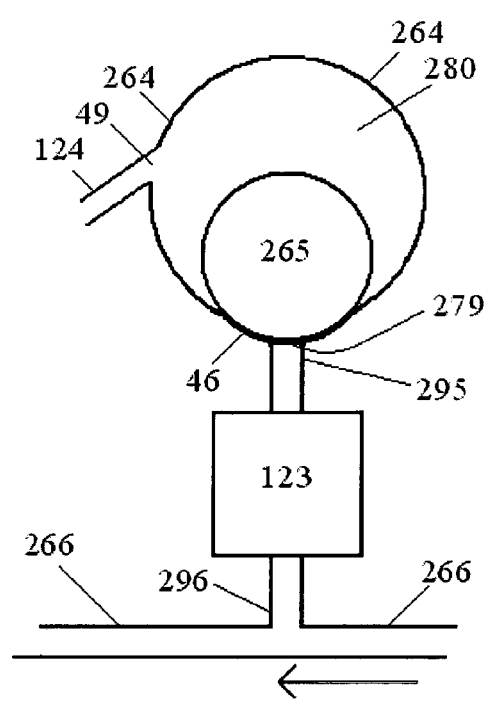
Fig. 13a Fig. 13b

SUBMERSIBLE ELECTRICAL POWER GENERATING PLANT

BACKGROUND OF THE INVENTION

1. Field of the Invention

The presently disclosed invention generally relates to improvements on a submersible electrical power generating plant. More specifically, the presently disclosed invention is primarily intended for providing an improved electrical power generating plant that is able to generate electricity from the kinetic energy contained in steady ocean currents.

2. Description of the Prior Art

Perhaps the most frightening aspect about the approaching energy crisis is that so few are aware of the seriousness of the problem and the devastating impact that the worsening shortages of oil and natural gas will have upon our industrialized society, upon our nation, and upon our lives. The decline in the production of both world oil and North American natural gas—combined with catastrophic global warming—have created an urgent need to switch from fossil fuels to those energy sources that are sustainable and non-polluting. Oceans' currents flow at all depths, with the strongest usually occurring in the upper layer, which is shallow compared to the depth of the oceans. The main cause of surface currents in the open ocean is the action of the wind on the sea surface.

Winds of high constancy, blowing over great stretches of an ocean, have the greatest effect on producing current. It is for this reason that the northwest and southeast trade winds of the two hemispheres are the mainsprings of the ocean's surface current circulation. In the Atlantic and Pacific oceans the two trade winds drive an immense body of water westwards over a width of some 50 degrees of latitude, broken only by the narrow belt of the east-going Equatorial Counter-current, which is found a few degrees north of the equator in both of these oceans. A similar westward flow of water occurs in the South Indian Ocean, driven by the southeast trade wind. These westward surface currents produce giant eddies that are centered in latitudes of approximately 30 degrees N. and S. that rotate clockwise in the northern hemisphere and counter-clockwise in the southern hemisphere. Currents of over 3.5 mph are confined to very restricted regions. They have been recorded in the equatorial regions of the oceans, and in the warm currents flowing to higher latitudes in the western sides of the oceans. Ocean Passages of the World (published by the Hydrographic Department of the British Admiralty, 1950), lists 14 currents that exceed 3 knots (3.45 mph), a few of which are in the open ocean.

The Gulf Stream and the Kuroshio are the only two currents that the book lists having velocities above 3 knots that flow throughout the year. The book states the strongest currents recorded for the Gulf Stream and the Kuroshio in nautical miles per day. These speeds are equivalent to 156.5 statute miles per day (6.52 mph) for the Gulf Stream, and 133 statute miles per day (6.375 mph) for the Kuroshio. Because these speeds were determined by how far the current carried floating objects in 24 hours, they do not reflect the maximum current speeds at specific times or places. Both the Gulf Stream and the Kuroshio are currents that are driven by the Coriolis force that is produced by the earth's eastward rotation acting upon the ocean currents produced by the trade winds. Because these currents are caused by the earth's eastward rotation, they will continue flowing through the Straits of Florida for as long as our planet continues to turn on its axis.

In addition to producing the Coriolis Effect that produces the oceans' gyres, another consequence of the earth's eastward rotation is that the center of each of those gyres is offset toward the western edge of the ocean basin that confines it. Because the volume of water flowing toward the poles along the narrower western sides of the gyres is the same as that circulating back toward the Equator down the much broader eastern expanses, the constricted western currents are forced to flow much faster than their eastern counterparts. This is what makes the Gulf Stream and the Kuroshio such powerful currents. Because the Gulf Stream's current is relatively consistent, well-placed turbines powered by that current should generate usable electricity virtually one hundred percent of the time.

The Gulf Stream starts roughly where the Gulf of Mexico narrows to form a channel between Cuba and the Florida Keys. From there the current flows northeast through the Straits of Florida between the mainland and the Bahamas, flowing at a substantial speed for some 400 miles. It hits peak velocity off Miami, where the Gulf Stream is about 45 miles wide and 1,500 feet deep. There the current has reached a speed of as much as 7.75 mph in its narrow central axis. Although the peak current velocity of the Gulf Stream may at times exceed 7 mph in its narrow axis off of Miami, the most likely velocities for those turbines placed in its central axis would most probably be between 4.75 and 6 mph.

As previously stated, the Kuroshio's maximum flow rate is only slightly slower than that of the Gulf Stream. Although turbines designed for the Gulf Stream can also generate low-cost electricity from the Kuroshio, they would probably not operate at quite the same high capacity factors in that current as they would in the Gulf Stream. This is because the velocity of the Kuroshio fluctuates more due to both seasonal and tidal effects, flowing slower in the fall and with rising tides. The current has two stable path patterns south of Honshu, the largest island of Japan. It has a straight path that flows eastward, after passing the tip of the Kii Peninsula, and it has a large meandering path that flows around a large coldwater mass that can form to the southwest of that peninsula Either pattern can persist for periods ranging from several months to several years. Because of the Kuroshio's changing paths and the extreme water depths in the area, there is only one location where the turbines can consistently produce power. That is just south of the Izu Peninsula and Sagami Bay, where both current paths pass over the Izu-Ogasawara Ridge, where the Pacific Plate subducts under the Philippine Sea Plate.

Other possible sites for submersible power plants include the East Australian Coast current, which flows at a top rate of 110.47 statute miles per day (4.6 mph), and the Agulhas current off the tip of South Africa, which flows at a top rate of 139.2 statute miles per day (5.8 mph). Oceanographic current data will suggest other potential sites. Tidal currents are of interest—not because a tethered submersible power generator would be well suited for harvesting their kinetic energy—but because they also involve the generation of electricity underwater, the transmission of that power to shore, and because serious money is being invested in their development, even though their capacity factors are very low. The tides are the periodic motion of the water caused by the differences in the gravitational attractive forces of the moon and the sun acting on all the different parts of the rotating Earth. As the tides rise and fall, periodic horizontal movements of water accompany them: the tidal currents. The variations in the speed of the tidal currents from place to place are not consistent with the range of the tides and, depending on the shape of the coastline; they can even be the reverse.

Although there is presently no interest in producing more power from a tide's changing water level, there is a growing interest in the tidal currents. As with all turbine power plants, the ability to produce electricity depends on the efficiency of the design and on the speed and steadiness of the fluid driving it. Although the usable current velocities that drive the tidal turbines can be about the same as those that would drive turbines placed in the Gulf Stream, the tidal currents oscillate and can produce power only between the high and low tides. The strengths of the tidal currents will also vary greatly depending the phases of the moon and whether the current is being produced by a spring tide or by a neap tide. As a result of the tidal current's oscillations and variations, the capacity factors for these tidal systems would almost certainly be less than 10 percent of the system's theoretical generating capacities. Because the capacity factors for the turbines operating in the Gulf Stream would be seven to ten times those of the tidal-powered turbines, they would produce seven to ten times as much power, and—unlike that wildly oscillating power produced by the tidal turbines—that power would be almost as steady as that power produced by many fossil-fuel plants. Although there will be some changes in the current's velocity, caused by the moon's tidal effects and the steadiness of the trade winds, the only renewable energy source that would have higher capacity factors than those of well-placed turbines in the Gulf Stream would be the conventional hydroelectric power plants that have sufficient water in their reservoirs.

Well-placed turbines in the Gulf Stream will spin whether or not there is any demand for their electricity. Because they would operate best under steady loads and because their operating costs would be virtually zero that power they produce that is in excess of that required by the grid can be used to produce energy in other forms. This can include the charging of batteries to power vehicles and the production of hydrogen. Common energy efficiencies for the electrolysis of water are at about 65%. However, by using catalysts in the water electrolyte, efficiencies of 80% to 85% are possible. The amount of hydrogen that can be produced by this method is directly proportional to the amount of electricity used. Instead of adding more gas-fired generating capacity to handle the periods of peak demand, we should strive to generate more than enough power from the water turbines' free energy to cover the peak loads and then add additional loads to fully utilize the surplus generating capacity during periods of low demand from the grid.

In this way, not only can these submersible turbines eliminate the need for fossil fuels to produce electricity, they can produce electricity for recharging the batteries of "plug-in" hybrid vehicles and hydrogen to power fuel-cell vehicles. Producing hydrogen by electrolysis can eliminate the need for a hydrogen transportation infrastructure because the hydrogen can be produced from water at local fueling stations during off-peak periods. Every kilowatt-hour of electricity that is generated by water, wind, and other renewable-energy sources can replace the same unit of electricity that is presently being generated by burning fossil fuels. Based on a study in the UK, that determined the carbon dioxide emission of their fossil-fuel plants, each of the submersible electrical power generating plants, having a design capacity of 1200 kilowatts and operating with a 90 percent capacity factor, would reduce the carbon dioxide emissions by roughly 8,100 US tons per year from that produced by the fossil-fuel plants producing the same amount of electricity.

Water has much more mass than air and would be moving more slowly. A cubic unit of water weighs about 854 times the same cubic unit of air at sea level. The amount of kinetic energy that passes through a turbine can be calculated using the formula:

$$KE = \tfrac{1}{2} \times M \times V^2 \quad M = \text{mass} \quad V = \text{velocity}$$

The mass is the weight of the fluid that passes through the turbine's rotor per second. This can be obtained by calculating the blades' sweep area and multiplying that quantity by the distance the fluid travels in one second. This volume is then multiplied by the weight of the fluid per cubic unit to get the mass. Because the mass passing through the blades in one second is a factor of the current's velocity, the power produced by the current does not increase by the square of its velocity, but by its cube. Therefore, the equation for the kinetic energy passing through a turbine can also be written:

$$(KE = \tfrac{1}{2} \times A \times D \times V^3 \quad A = \text{area swept} \quad D = \text{density/cu.m.} \quad V = \text{velocity})$$

| Rotor Diameters to Generate 600 Kilowatts of Electricity in Currents of Different Velocities in MPH ||
|---|---|
| Assuming 45% current velocity | Efficiency rotor diameter |
| 7.0 | 34.1 |
| 6.5 | 38.1 |
| 6.0 | 43.0 |
| 5.5 | 49.0 |
| 5.0 | 56.5 |
| 4.5 | 66.2 |
| 4.0 | 79.0 |
| 3.5 | 96.5 |
| 3.0 | 110.0 |

To increase the RPM and reduce the torque to manageable levels, the power from the hubs is transferred in either three or four stages to the shaft powering the generator. The first stage consists of a strongly built planetary gear system. A second planetary gear system is either attached to a third planetary gear system or to helical gears, depending on the revolutions and torque of the shaft coming from the first stage. The last stage consists of helical gears—and, depending on the sizing of the gears in the first two or three stages, a fourth stage of helical gears could be required to increase the generators' shaft speeds to the 1,200 RPM required by the 6-pole generators and the 1,800 RPM required by the 4-pole generators to produce electricity that is compatible with the 60 Hz current used in the US. The technology to generate electric power from the kinetic energy contained in the moving water can be virtually identical to that used by the wind-power industry.

Wind turbines that generate electric power usually have two or three long, narrow rotor blades. The have these long blades—not because they can capture the most energy from the wind—but because the blades must be able to survive violent wind conditions. A wind turbine with many blades or very wide blades (turbines with a solid rotor) would be subject to extremely large forces when the wind blows at hurricane velocities because the energy increases with the cube of its velocity. To limit the impact from these extreme conditions, the manufacturers of the wind machines prefer that their turbines have only two or three long narrow rotor blades that can be feathered and locked. Because most of the force driving the Gulf Stream portion of the North Atlantic's gyre is produced by the steady eastward rotation of our planet, the current's speeds tend to remain within a narrow range. Very rarely do they exceed 7 mph or drop below 4 mph in the current's central axis off South Florida. Because the water would be nearly a thousand times denser than the air and would be flowing at a much more constant velocity, instead of their rotors having just two or three narrow blades to absorb the kinetic energy from a small percentage of the fluid passing through the sweep area, they can have more or wider blades.

All generators produce heat. The electric current flowing through the conductors, both the stator and rotor, produces heat because of resistance. In addition, heat is generated in the steel of the rotor armature core by the changing of magnetic lines. Although the amount of heat from all the losses in large generators is only about one percent of the output, it can be numerically great. For example, a pair of generators producing a total of 1,200 kW might have a loss of 12 kW—equivalent to 40,973 Btu per hour. Unlike the wind turbines that can operate on hot summer days, the water turbines would operate in water having temperatures of about 70° Fahrenheit. However, because plastics do not have the same ability to transfer heat as do the metal housings used on the wind turbines, and because there will be no outside source of air for cooling, some type of external cooling system will be required to dissipate the heat produced by the generators and gearboxes.

A major concern for any tethered submersible power plant is the downward vector force that is produced by the horizontal-drag force acting through the downward-angled anchor line. That downward force will equal the horizontal drag, multiplied by the tangent of the anchor line's downward angle where it attaches to the generating plant. If a tethered generating power plant is to maintain a uniform depth, any changes in the downward vector forces must be balanced be equal opposing forces. If the increasing downward vector force is not equalized, the downward vector forces will pull the submersible power plant down to that depth where the angle of the anchor chains' pull would be reduced sufficiently that the tangent of the attachment angle will be reduced enough that the resulting downward-vectored forces will again balance the reduced lifting forces. The forces would again be in equilibrium and the unit would remain at that depth as long as there were no further changes in the horizontal drag. Because the downward forces increase at an increasing rate as the angle of the downward pull increases, the angle of the anchor chain where it attaches to the unit should be kept reasonably small. That angle should also be kept small because the forces pulling on the anchor line will increase with the reciprocal of the cosine (the secant) of the angle—and as that angle increases, increasing the pull on the anchor chain, the anchor's holding ability is decreasing.

Most of the prior art for generating electricity from ocean currents can be grouped into a few categories. There are the water wheels and rotating canisters that are mounted on vertical shafts that have V-shaped, cupped or articulated buckets, fins, or flippers to reduce the resistance to the water when the periphery of the wheels are moving toward the current. U.S. patents in this group include U.S. Pat. No. 3,973,864 issued to Atherton, U.S. Pat. No. 4,038,821 issued to Black, U.S. Pat. No. 4,134,710 issued to Atherton, U.S. Pat. No. 4,551,066 issued to Frisz, U.S. Pat. No. 4,748,808 issued to Hill, U.S. Pat. No. 4,818,888 issued to Lenoir, and U.S. Pat. No. 6,006,518 issued to Geary. There are patents for devices having vertical turbines that are mounted on horizontal shafts that do not use shrouds or other devices that surround the rotors. These patents include U.S. Pat. No. 4,023,041 issued to Chappell, U.S. Pat. No. 4,137,005 issued to Comstock and U.S. Pat. No. 5,440,176 issued to Haining. Then there are more U.S. patents that use turbines mounted on horizontal shafts in which the rotors are enclosed in shrouds, flarings, hollow tubes, Venturi-shaped tubes, or have funnel-shaped intakes for the purpose of increasing the water velocity through the turbine. Examples of these include U.S. Pat. No. 3,980,894 issued to Vary, U.S. Pat. No. 3,986,787 issued to Mouton, U.S. Pat. No. 4,095,918 issued to Mouton, U.S. Pat. No. 4,163,904 issued to Skendrovic, U.S. Pat. No. 4,205,943 issued to Vauthier, U.S. Pat. No. 4,306,137 issued to Wracsaricht, U.S. Pat. No. 4,335,319 issued to Mattersheimer, U.S. Pat. No. 4,520,273 issued to Rowe, U.S. Pat. No. 6,064,123 issued to Gislason. Counter-rotating impellers are used in U.S. Pat. No. 4,203,702 issued to Williamson. The blades on these devices overlap and there are V-shaped diverters located ahead of the turbines force the fluid to the outside of the turbines.

All the inventions mentioned above are devices that are mounted on underwater structures or are suspended from barges, pontoons, or platforms on pylons at the surface. The problem with mounting the generating devices on platforms is that the strongest currents are located near the surface where the depths are usually greater than 1,200 feet and mounting the generating devices high above the ocean floor on giant structures would be extremely costly. Because the turbines would be producing their drag forces far from the ocean floor, they would produce huge tipping moments that would equal the horizontal drag of the structure, multiplied by height of those drag forces above the ocean floor. If the structures had shorter towers, the submersible power plants would be much more difficult to install and service and the turbines would be beneath the stronger current flow. The problem with suspending the turbines from barges or pontoons is that they would interfere with ship traffic, be vulnerable to violent storms, and be unsightly.

Among the patented inventions to generate electricity from ocean currents, there are tethered devices that rely on hydrofoils and/or ballast tanks to provide lifting forces to keep the devices at the desired depths. U.S. Pat. No. 6,091,161 issued to Delhsen uses variable-pitch rotor blades to limit the drag force. Although this patent may have things in common with the presently disclosed invention in that they are both tethered and have counter-rotating, rear-facing turbines, the inventions are very different. The Delhsen's submersible underwater generating device would have little or no stability because, with the buoyancy tank being between the heavy elements and not above them, its center of buoyancy is not above the center of gravity.

Also the lifting force provided by the hydrofoil that joins the nacelles is at the same level as the heavy elements, further adding to a lack of stability. The upward canted hydrofoil wing tips that supposedly provide roll stability would have little or no effect unless the hitch points to the two anchor lines were lower. Because the anchor lines attach directly ahead of the center of drag, the canted wing tips would have little effect on stability. The resistance to roll is further decreased in the Delhsen invention by the anchor line's attachment point being at the same height as the center of buoyancy rather than below it. With the attachment point located at the center of buoyancy, if the device should have positive buoyancy, the canted wing tips would decrease stability. The placement of the stabilizer fin forward of the hydrofoil makes no sense. With the anchor attachment points being behind this "stabilizing fin," the fin would make the device more unstable. The device uses two anchors, each connected to capstans that are located at the front of each nacelle to adjust the anchor chains to eliminate yaw.

The hydrofoil between the nacelles contains separate ballast tank compartments that are capable of being filled with fluid or purged to control buoyancy and the shift the center of buoyancy. The nacelles also contain buoyancy tanks that can be independently filled or purged to compensate for roll of the device. The Delhsen invention utilizes a computer system to balance those forces produced by the hydrofoil, buoyancy and drag to allow the device to seek that current that will allow for an even production of electric power. The drag force on the rotors is controlled by adjusting the pitch of the rotor blades so that the device seeks an initial equilibrium velocity of water current that will allow the tethered device to stay within a chosen predetermined depth range. A problem with this approach is that, although the purpose of the generator is to capture kinetic energy to maximize power output, it controls the depth by reducing that output.

U.S. Pat. No. 6,109,863 issued to Milliken is another tethered unit that consists of a buoyant device that contains two counter-rotating water wheels or turbines that are mounted side-by-side on vertical shafts. The vanes of the turbine have sub-vanes that open when the large vanes are moving toward the current to allow the water to pass through them. Although these are counter-rotating turbines are side-by-side, because they are mounted on vertical shafts, their counter rotation has no effect on the device's stability. In this and all other devices that use turbines mounted on vertical shafts—not only are the areas for capturing the energy of the moving fluid small in proportion to the frontal area of the device, they waste additional energy because—even though the fins on the reverse side of the vertical turbine may fold or open to allow water to have much less resistance as they rotate toward the front of the turbine—they still produce some drag that must be subtracted from the power produced by that side of the turbine that is being pushed by the kinetic energy of the flowing water.

The inefficiencies of all these vertical shafted turbines can be compared to using paddle wheels for propelling boats rather than modern propellers, except they would be worse because the top blades of a boat's paddle wheel meets far less resistance when moving forward through the air than would those blades of a vertical-shafted water turbine blades moving against the much denser water. Also the invention has no means of balancing changing downward vector forces that would result from changes in drag, caused by changes in either the current velocity or changes in the generator loads acting on the downward angled anchor line.

U.S. Pat. No. 4,219,303 issued to Mouton is a tethered unit with a pair of axle-less, counter-rotating, co-axial turbine wheels having ring rims that bear against friction drive wheels which turn one or more electrical generators that are contained in water-tight rooms within the wall of a nozzle or shroud that surround the periphery of the turbines. To increase the velocity of the water through the turbines, the device has an opening nozzle in the front that directs the water into a narrowing vena contracta, through the two counter-rotating, co-axial turbines and then on to an expanding shroud downstream that is for the purpose of increasing the water's velocity. This device depends on buoyancy and a weight on the bottom to maintain the proper depth. Many devices use vertical turbines mounted radially on horizontal shafts that are enclosed in shrouds, hollow tubes, Venturi-shaped tubes, or have funnel-shaped intakes to increase the fluid velocity through the turbines. Although it is possible for the velocity of a fluid passing through a vertical turbine's sweep area to be increased somewhat by using these devices, tests have shown that the turbines' input can be increased at much lower cost by simply increasing the rotors' diameters. Shrouds and Venturi-shaped tubes are not used on commercial wind-powered turbines because they do not increase the velocities enough to justify their cost. Instead of using such devices, the manufacturers of the wind machines increase the diameters of the turbine rotors.

A key consideration when designing a tethered submersible generator is that of stability. A fully submerged object that is floating freely in a liquid will float with its center of buoyancy (the center of gravity of the fluid that the object is displacing) directly above the objects center of gravity. The prior art does not show tethered submersible electrical power plants that utilized this principal of physics, except for U.S. Pat. No. 6,531,788 ('788 patent), which is issued to the author and discloses a first submersible generating plant for producing electricity from ocean currents, as briefly described hereinafter.

The '788 patent teaches an apparatus comprising two counter-rotating, rear-facing turbines with a plurality of rotor blades extending radially outward from two separate horizontal axis that convey the kinetic energy from the two side-by-side turbine rotors through separate gearboxes to separate generators that are housed in two watertight nacelles that are located sufficiently far apart to provide clearance for the turbine rotors. The two generators and their gearboxes serve as ballast and are located below a streamlined buoyancy tank that extends fore and aft above and between them. A leverage system having no moving parts adjusts lifting forces to balance changing downward vector forces that result from changes in drag acting on the downward angled anchor line.

Although previous inventions may also generate electric power with low operating costs, none can produce as much power at such low cost per kilowatt-hour as the currently disclosed invention because of its highly efficient energy-collecting design and its extremely low maintenance requirements. Thus, it is a principal object of the current invention to provide a submersible electrical power generating plant that is capable of being free of service or replacement for many years. It is a further object of the current invention to provide a stable submersible electrical power generating plant that has its center of buoyancy located above its center of gravity. It is a still further object of the current invention to provide a submersible electrical power generating plant that has an adjustable center of gravity. It is a further object of the current invention to provide a submersible electrical power generating plant that is capable of generating electrical power from low speed current flow when equipped with turbines, generators, and gearing are properly sized for the slow current.

Still further, it is an object of the current invention to provide a non-polluting means of producing steady, low-cost electric power than can be used to cover both base and peak load requirements. It is a further object of the current invention to provide a tethered submersible electrical power generating plant that will remain within any pre-set range of depths without requiring a line being attached to a weight on the ocean floor. It is a further object of the current invention to provide a submersible electrical power generating plant designed to facilitate the efficient simultaneous submersions of many of the submersible electric power generating plants that have been assembled into strings while floating on the surface by throwing an electric switch. It is a further object of the current invention to provide a submersible electrical power generating plant with a simple and efficient method for bringing an individual submersible power generating plant to the surface and of removing the ballast water. It is a further object of the present invention to provide a method for simultaneously raising a group of many power plants to the surface without being disconnected from the electricity collecting table.

It is a further object of the current invention to provide a submersible electrical power generating plant having low parasite drag (that drag that does not contribute to the capturing of energy or providing lift) and which a high percentage of the horizontal drag forces are from that kinetic energy that is actually converted into electricity. It is a further object of the current invention to provide a submersible electrical power generating plant that is made of carbon fiber composites and other plastics to minimize displacement and eliminate corrosion. It is a further object of the current invention to provide a submersible electrical power generating plant that has improved directional stability. It is a further object of the current invention to utilize the same changes in the current's kinetic energy that changes the downward vector forces to adjust the lifting forces to balance those downward forces.

It is a further object of the current invention to utilize those unchanging lifting forces produced by displacement to support the unchanging weight of the submersible electrical power generating plant, and to utilize those changing lifting forces produced by the hydrofoils to balance the changing downward vector forces. It is a further object of the current invention to provide a submersible electrical power generating plant capable of using hydrostatic pressures to control the hydrodynamic lifting forces to accurately and reliably control operating depths. It is a further object of the current invention to provide a means for bringing the submersible electrical generating structures quickly to the surface and to purge the buoyancy tank of ballast water with pressurized air.

Other objects of the current invention, as well as particular features, elements, and advantages thereof, will be elucidated in, or apparent from, the following description and the accompanying drawing figures.

SUMMARY OF THE INVENTION

According to the present invention, a submersible electrical power generating plant is disclosed for generating electrical power with no fuel costs from the flow of ocean current. In the present invention, a submersible electrical power generating plant for generating electrical power, with virtually no operating costs, from the flow of ocean current has a submersible electrical power generating structure and an electrical power collection and transmission structure connected to the submersible electrical power generating structure for collecting and transmitting electrical current.

The submersible electrical power generating structure, made of carbon fiber composites and other non-corroding plastics, has a superior located center of buoyancy (the center of gravity of that water being displaced), an inferior located center of gravity and a center of drag (that point where sum of all the drag forces caused by every exposed part of an object moving through a fluid are balanced). The power generating structure has a streamlined torpedo-shaped buoyancy tank with a nose end, a rear end, a top side, a bottom side, a left side, a right side, a plurality of valves and a plurality of compartments. The center of gravity of the submersible electrical power generating structure can be changed by adding water into or subtracting water from the plurality of compartments of the streamlined torpedo-shaped buoyancy tank. The streamlined torpedo-shaped buoyancy tank has a vertical tail fin capable of improving directional stability of the submersible electrical power generating structure. The vertical tail fin can be on either the top side of the submersible electrical power generating structure extending upward or the bottom side of the submersible electrical power generating structure extending downward. The water level in each of the plurality of compartments is adjustable by piping the water in and out through the plurality of valves.

There is a water-pressure reading device, pipe system, and pumps capable of transferring ballast water between the front and the rear compartments of the torpedo-shaped buoyancy tank for the purpose of moving the center of gravity forward or rearward. The power generating structure has a pair of side-by-side counter-rotating water turbine rotors. The water turbine rotors are full bladed, having rotor blades that cover most of the turbines' sweep area. The pair of side-by-side counter-rotating full-bladed water turbine rotors are made of carbon fiber composites and sufficiently hollow so that their density is approximately the same as that of the water that is displaced by the pair of side-by-side counter-rotating full-bladed water turbine rotors. The pair of side-by-side counter-rotating full-bladed water turbine rotors turn so that both the plurality of first blades and the plurality of second blades are preferably moving downward at the center of the submersible electrical power generating plant and upward on the outside of the submersible electrical power generating plant.

One of the pair of side-by-side counter-rotating full-bladed water turbine rotors is a mirror image of the second water turbine rotor. Each of the pair of side-by-side counter-rotating full-bladed water turbine rotors has a horizontal water turbine axis parallel to the streamlined torpedo-shaped buoyancy tank. Each of the pair of side-by-side counter-rotating full-bladed water turbine rotors has a plurality of rotor blades, which extend radially outward from the horizontal water turbine axis. The pair of counter-rotating full-bladed water turbine rotors is located beneath the streamlined torpedo-shaped buoyancy tank and facing rear end of the streamlined torpedo-shaped buoyancy tank. The power generating structure has a pair of watertight nacelles. Each of the pair of watertight nacelles is connected to one of the pair of horizontal water turbine axis.

The pair of watertight nacelles is firmly connected to each other through a center connecting means, which has an upside, a down side and a center point. The center point is located slightly forward of and below the center of drag of the submersible electrical power generating structure. The center connecting means being securely mounted to the bottom side of the streamlined torpedo-shaped buoyancy tank through a third connecting means, which is long enough to ensure the submersible electrical power generating structure having the center of buoyancy above the center of gravity. The pair of watertight nacelles is securely mounted to the bottom side of the streamlined torpedo-shaped buoyancy tank. Each of the pair of watertight nacelles has a low-speed shaft connecting to the horizontal water turbine axis, a gear box connecting to the low-speed shaft capable of converting low speed to high speed, a high-speed shaft connecting to the gear box, and an electrical power generator driven by the high speed shaft capable of generating electrical power. The pair of watertight nacelles is located sufficiently far apart to provide clearance for the pair of side-by-side counter-rotating full-bladed water turbine rotors. The center-connecting means has a cooling system capable of effectively and efficiently distributing heat generated by the gearboxes and the electrical power generators to outside water.

To maintain a uniform depth, increases in the downward vector force that are caused by increased drag acting through the downward angled anchor line must be balanced by an equal and opposite lifting force. Those lifting forces that are produced by displacement are not affected by current velocity and are used primarily to provide positive buoyancy to the submersible generator's structure. Those lifting forces that are produced by the flow of a fluid over an airfoil-shaped hydrofoil are affected by current velocity, and these lifting forces are utilized to balance the changing downward forces by changing the hydrofoil's angle of attack. The angle of attack is increased by raising the front edge of the hydrofoil higher than the back edge of the hydrofoil in relation to the flow of the water. With the vertical height of the anchor line attachment point properly adjusted on a strong bar (which acts as a lever), increased drag—which will increase the downward vector force—will provide the proper leverage to that bar to cause the increased pull on the anchor line to cause the entire submersible power plant to rotate vertically (raising the nose and dropping the trail) so that the hydrofoils increasing angle of attack will provide only that additional lifting force required to balance the increased downward vector force—thereby allowing the submersible generating plant to remain at a uniform depth.

Though the leveraged force provided by the anchor line being attached below the submersible electric power generating plant's center of drag is capable of adjusting the lifting forces produced by the hydrofoils to approximately balance the changing downward vector forces, there is a supplementary depth-control system capable of precisely adjusting the lifting forces as required to keep the submersible electric power generating plant operating within any specific range of depths. The supplementary depth-control system utilizes a pressure switch that is activated by the hydrostatic pressures to controls pumps that are capable of transferring ballast water between the front and the rear compartments of the streamlined torpedo-shaped buoyancy tank for the purpose of shifting the center of gravity longitudinally to adjust the hydrodynamic lifting forces produced by the attached airfoil-shaped hydrofoils to accurately and reliably control the operating depths of the submersible electrical power generating structure.

If the electricity from the grid that magnetizes the generators' stators is switched off, the ability of the generators to produce electricity stops, which will allow the turbine rotors to spin with little resistance, which will, in turn, reduce the horizontal drag. The reduced horizontal drag will reduce both the downward vector force and the tension on the anchor line. The reduction in the tension on the anchor line that is attached to a point that is below the center drag will cause a reduction in the leveraged vertical rotational force on the submersible electric power generating structure, which will cause the front end of the generating structure to move lower and the rear end of the generating structure to move higher, which will decrease the angle of attack of the attached hydrofoils, which will reduce the hydrofoils' lifting force to approximately balance the reduction in the downward vector force. After the submersible electrical power generating plant has been disconnected from the electricity collecting cable the electricity collecting cable has been disconnected from the bottom side of the anchor line, the conventional valves of the pressurized ballast water purging system are opened, with the conventional valves that drain the front compartments being opened more than the conventional valves that drain the rear compartments.

The pressurized air within the torpedo-shaped buoyancy tank pushes the ballast water from the plurality of compartments, pushing the ballast water from the front compartments faster than from the rear compartments. The pressurized air in the streamlined torpedo-shaped buoyancy tank forces the ballast water out through the separate drain holes, through the separate drain pipes, through the special valves that allow only fluid to flow, through the separate conventional valves, and though the common pipe to the front of the streamlined torpedo-shaped buoyancy tank, where the ballast water is ejected forcibly downward. The combination of the more rapidly increasing buoyancy in the front compartments of the torpedo-shaped buoyancy tank and the equal opposite reaction to the water being ejected forcibly downward from the front end of the streamlined torpedo-shaped buoyancy tank will lift the front end of the submersible electrical power generating plant faster than the rear end of the submersible electrical power generating plant, which will—in turn—increase the hydrodynamic lifting force produced by the increased angle of attack of the attached hydrofoils.

As each of the separate compartments of the streamlined torpedo-shaped buoyancy tank empties of ballast water, each of the separate special valves in each of the separate drain lines will shut to conserve the pressurized air in the streamlined torpedo-shaped buoyancy tank. The increasing lifting forces produced by the combination of the increasing buoyancy, the increasing hydrodynamic lift, and the equal and opposite reaction to the downward ejection of the ballast water from the front end of the torpedo-shaped buoyancy tank will lift the submersible electrical power generating structure to the surface. There is a check valve in the common pipe of the drain system to prevent seawater from re-entering the drain system to flood the plurality of compartments, should the air pressure inside the streamlined torpedo-shaped buoyancy tank be allowed to drop while the submersible electrical power generating structures is in the water. All the conventional valves in the drain system must be closed prior refilling any of the plurality of compartments with ballast water to prevent that water from siphoning between compartments having differing water levels.

The electric cables for collecting the electricity from the separate submersible electrical generating plants must be suspended from the bottom side of the anchor lines for a single submersible electrical power generating plant to be brought to the surface. The electrical extension cable must also be attached along its length to the anchor line so that the lower end of the electrical extension cable will be near the underwater junction box to which it will later be reconnected when the submersible electrical power generating plant is returned to service.

The system for purging the buoyancy tank can be modified to permit any submersible electric power generating plants to be raised together from the operating depths by replacing the conventional valves in the ballast water drainage system with electrically controlled valves that can all be opened simultaneously in all of the many submersible electrical power plants in a group. Using the electrically controlled valves, the group of submersible electrical power generating plants can be brought simultaneously to the surface and the buoyancy tanks emptied of ballast water while all the submersible electrical power plants are still connected to the electricity collecting cable.

Another option is to replace the conventional valves that drain the individual compartments with special check valves similar to the special check valves in the ballast water transfer system and have an electrically controlled valve in the common drain line. Because the special check valves prevent siphoning between the compartments, the only electrically controllable valve required would be in the common drain line.

BRIEF DESCRIPTION OF THE DRAWINGS

Other features of the current invention will become more evident from a consideration of the following detailed description of the patent drawings:

FIG. 1 is a side view of the submersible electrical power generating plant that shows the underwater switches and junction box that permits the recovery and replacement of the submersible electrical power generating plant.

FIGS. 12*a* and 12*b* are drawings of special check valve that will not water to flow in one direction and will water to flow in the other direction only when the water pressure is above a minimum.

FIGS. 13*a* and 13*b* are drawings of a special valve in the pressurized ballast water purging system, shown in FIG. 10 that will allow liquid to pass through but not air.

DETAILED DESCRIPTION OF THE PREFERRED EMBODIMENT

Figure 2:
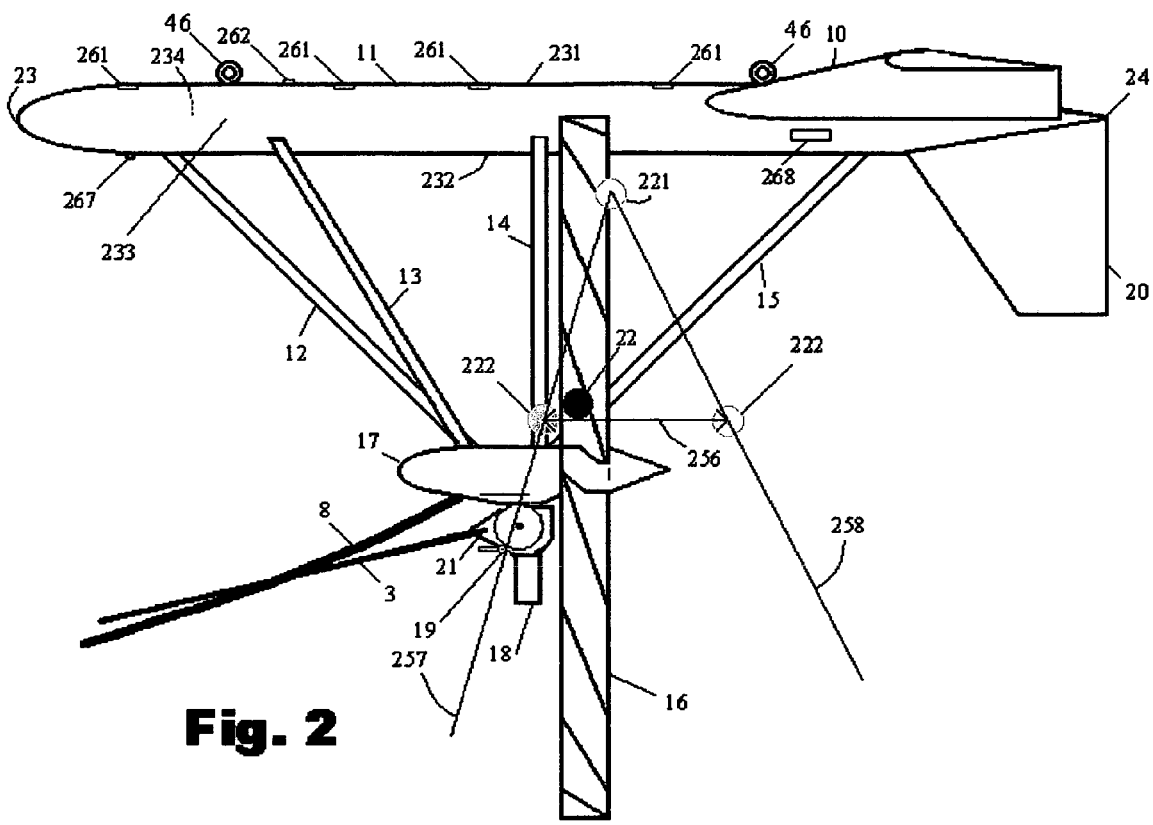
FIG. 2 is a side view of the submersible electrical power generating structure in FIG. 1.

Referring now to the drawings, the present invention concerns a submersible electrical power generating plant for generating electrical power with no fuel costs from the flow of ocean current. The invention discloses a new and improved apparatus to capture the kinetic energy from the faster moving water that is near the surface of those steady currents that are the result of the Coriolis force produced by the Earth's eastward rotation acting on those currents produced by the trade winds. Instead of building giant structures that rest on the sea floor, the invention utilizes the forces produced by buoyancy, hydrodynamics, kinetic energy, leverage, and weight to keep the submerged generators aligned to the current and stable at the desired depth. The invention consists of two counter-rotating, water turbines with a plurality of rotor blades extending radially outward from two separate horizontal axis that convey the kinetic energy from the two side-by-side rear-facing turbine rotors through separate speed-increasing gearboxes to separate generators that are housed in separate watertight nacelles that are located sufficiently far apart to provide clearance for the turbine rotors. The pair of side-by-side rear-facing turbine rotors is full bladed, having a plurality of wide rotor blades that cover most of the turbines' sweep area. The side-by-side turbines and generators rotate in opposite directions so that the torque effect produced by one turbine and generator that would otherwise spin the unit in the direction opposite to the rotating turbine is canceled by the opposite and equal torque from the other turbine. The invention's watertight nacelles that contain the heavy generators and gearboxes are positioned below a torpedo-shaped buoyancy tank to provide stability.

Referring now to FIG. 1, which is a side elevation view of the submersible electrical power generating plant for generating electrical power with no fuel costs from the flow of ocean current. The submersible electrical power generating plant has a submersible electrical power generating structure 1, which is below the water's surface 2 tethered by an anchor line 3, and above the sea floor 9. An underwater electrical extension cable 4 and an underwater linking cable 43 carries the electricity between the submersible electrical power generating plant 1 to an electricity gathering cable 5, which is neutrally buoyant, that crosses under the anchor lines to collect the electricity from many other similar generating devices. To permit the re-attachment of the underwater electricity extension cable 4 when replacing the submersible electric generating plant 1, the electrical linking cable 43 at junction box 6, the underwater electricity extension cable 4 is fastened to the anchor line 3 at locations 8. The underwater linking cable 43 contains a waterproof switch 7 capable of cutting off the electric current to and from the grid.

Referring now to FIGS. 2, 3, 4, and 10. The submersible electrical power generating structure 1 has a high center of buoyancy 221 (the center of gravity of the water that is displaced), a low center of gravity 222 (adjustable forward and rearward with ballast water) and a center of drag 22 (that point where sum of all the drag forces caused by every exposed part of an object moving through a fluid is balanced). The submersible electrical power generating structure 1 further comprises a streamlined torpedo-shaped buoyancy tank 11 with a nose end 23, a rear end 24, a top side 231, a bottom side 232, a left side 233, a right side 234, and a plurality of compartments 68, 69, 77, 80 and 101. The center of gravity 222 of the submersible electrical power generating structure 1 can be changed longitudinally along line 256 by moving ballast water between the front compartment 68 and the rear compartment 69 of the streamlined torpedo-shaped buoyancy tank 11. If the submersible electric power generating plant 1 were floating freely underwater, the center of gravity 222 would be directly under the center of buoyancy 221. Lines 257 and 258 illustrates how the movement of the center of gravity along line 256 produces forces to vertically rotate the submersible electric power generating structure 1. The streamlined torpedo-shaped buoyancy tank 11 has a vertical tail fin 20 capable of improving directional stability of the submersible electrical power generating structure 1, a pair of airfoil-shaped hydrofoils 10, a pair of side-by-side counter-rotating full-bladed water turbine rotors 16 and 28, and a pair of watertight nacelles 17 and 27. The vertical tail fin 20 can be on either the top side 231 of the submersible electrical power generating structure 1 extending upward or the bottom side 232 of the submersible electrical power generating structure 1 extending downward.

The pair of airfoil-shaped hydrofoils 10 has a first airfoil-shaped hydrofoil 201 and a second airfoil-shaped hydrofoil 202. The first airfoil-shaped hydrofoil 201 is a mirror image of the second airfoil-shaped hydrofoil 202. The first airfoil-shaped hydrofoil 201 is fixed on the left side 233 of the streamlined torpedo-shaped buoyancy tank 11 projecting horizontally leftward and the second airfoil-shaped hydrofoil 202 is fixed on the right side 234 of the streamlined torpedo-shaped buoyancy tank 11 projecting horizontally rightward. The pair of airfoil-shaped hydrofoils 10 is located at the rear end 24 of the streamlined torpedo-shaped buoyancy tank 11. The pair of airfoil-shaped hydrofoils 10 is capable of providing the submersible electrical power generating structure 1 with more lift at high angles of attack when the leading edges of the hydrofoils are higher than the trailing edges in relation to the flow of water. The water level in each of the plurality of compartments 68, 69, 77, 80, and 101 is adjustable by piping the water in and out.

The pair of side-by-side counter-rotating full-bladed water turbine rotors 16 and 28 is sufficiently hollow so that their density is near that of the water displaced by the pair of side-by-side counter-rotating full-bladed water turbine rotors 16 and 28. The pair of side-by-side counter-rotating full-bladed water turbine rotors 16 and 28 turn so that both the plurality of first blades 205 and the plurality of second blades 206 are moving downward at the center of the submersible electrical power generating plant and upward on the outside of the submersible electrical power generating plant. The pair of side-by-side counter-rotating full-bladed water turbine rotors 16 and 28 has a first water turbine rotor 16 and a second water turbine rotor 28. The first water turbine rotor 16 is a mirror image of the second water turbine rotor 28. The first water turbine rotor 16 has a first horizontal water turbine axis 203 parallel to the streamlined torpedo-shaped buoyancy tank 11 and a plurality of first rotor blades 205. The plurality of first rotor blades 205 extend radially outward from the first horizontal water turbine axis 203.

The second water turbine rotor 28 has a second horizontal water turbine axis 204 parallel to the first horizontal water turbine axis 203 and a plurality of second rotor blades 206. The plurality of second rotor blades 206 extend radially outward from the second horizontal water turbine axis 204. The pair of counter-rotating water turbine rotors 16 and 28 is located beneath the streamlined torpedo-shaped buoyancy tank 11 and facing rear end 24 of the streamlined torpedo-shaped buoyancy tank 11. The pair of watertight nacelles 17 and 27 has a first watertight nacelle 17 and a second watertight nacelle 27. The first watertight nacelle 17 connects to the first horizontal water turbine axis 203. The second watertight nacelle 27 connects to the second horizontal water turbine axis 204. Both the first watertight nacelle 17 and the second watertight nacelle 27 are firmly connected to each other through a center connecting means 29 and 30. The center connecting means 29 and 30 has an upside 207, a down side 208, a center support section 32, and a center point 209. The center point 209 is located below and slightly forward of the center of drag 22 of the submersible electrical power generating structure 1. (The center of drag is the sum of the drag forces caused by every exposed part of an object moving through a fluid and it is located where all the drag forces are balanced). The center-connecting means 29 and 30 is securely mounted to the bottom side 232 of the streamlined torpedo-shaped buoyancy tank 11 through a third connecting means 12, 13, 14, 15, 25 and 26.

The center connecting means 29 and 30 has a cooling system 31 capable of distributing heat produced within the pair of watertight nacelles 17 and 27 to outside water. The third connecting means 12, 13, 14, 15, 25 and 26 are long enough to ensure the submersible electrical power generating structure 1 having the center of buoyancy 221 located above the center of gravity 222. The first nacelle 17 is securely mounted to the bottom side 232 of the streamlined torpedo-shaped buoyancy tank 11 through a first connecting means 13 and 14. The second nacelle 27 is securely mounted to the bottom side 232 of the streamlined torpedo-shaped buoyancy tank 11 through a second connecting means 25 and 26. The pair of watertight nacelles 17 and 27 is located sufficiently far apart to provide clearance for the pair of side-by-side counter-rotating full-bladed water turbine rotors 16 and 28.

Figure 5:
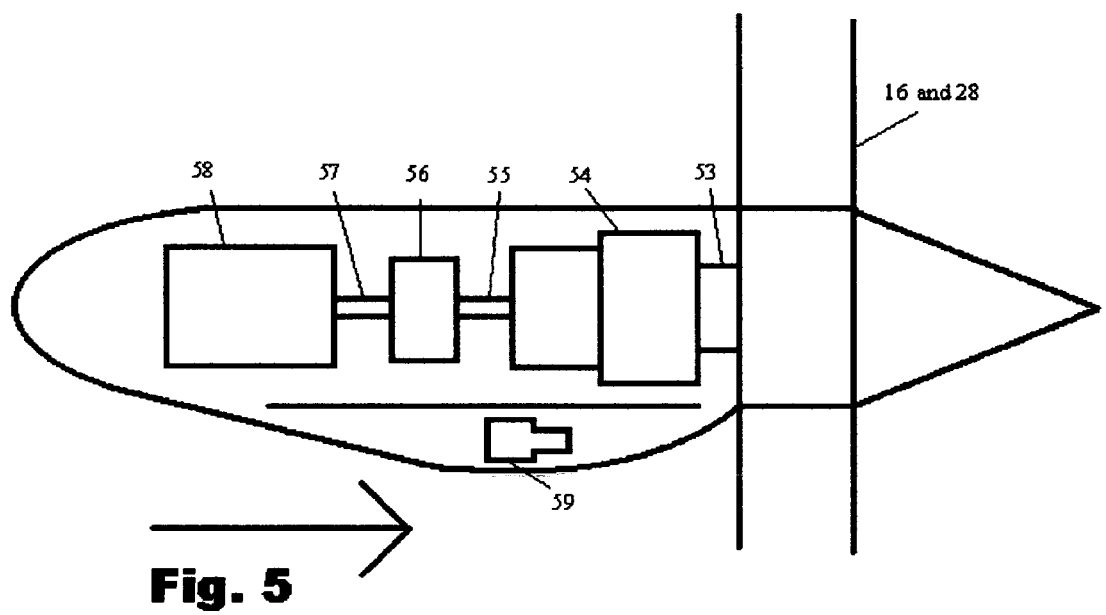
FIG. 5 is a cross section view of a nacelle.

FIG. 5 shows the inside structure of the first watertight nacelle 17. The first water turbine rotor 16 turns a first low-speed shaft 53 with great torque. A first gearbox 54 containing planetary and helical gears converts the low speed to high speed to drive a first high-speed shaft 55. An eddy current clutch 56 makes the connection between the first high speed shaft 55 and 57 when the RPM of the shaft are synchronized with the 60-cycle current to drive the first electrical power generator 58. The invention may be modified to produce the same amount of electricity from low current velocities by increasing the diameter of the pair of side-by-side counter-rotating full-bladed water turbine rotors 16 and 28 and by increasing the gearing in the first gearbox 54 in first watertight nacelle 17, and second gearbox (not shown) in the second watertight nacelle 27 to convert the slower shaft speed to the high shaft speed required by the generator 54. At the bottom of each of the nacelles is a float operated sump pump 59. Since the second watertight nacelle 27 is a mirror image of the first watertight nacelle 17, the second watertight nacelle 27 has a similar structure as the first watertight nacelle 17. All the first gear box 54, the second gear box, the first low-speed shaft 53, the second low-speed shaft, the first high-speed shaft 55, the second high-speed shaft, the first electrical power generator 58 and the second electrical power generator are lubricated and cooled by oil.

Figure 3:
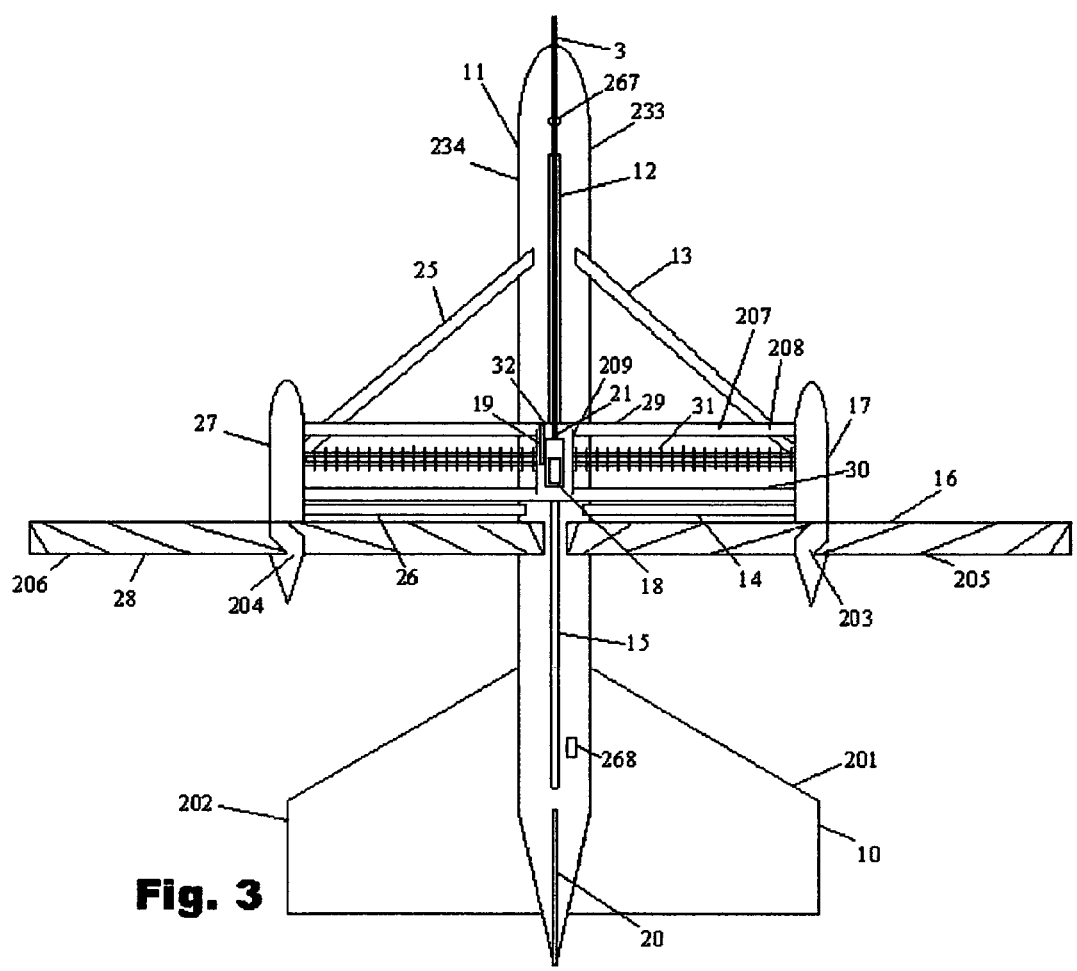
FIG. 3 is a bottom view of the submersible electrical power generating structure in FIG. 2.

Referring to FIGS. 2 and 3, the anchor line 3 attaches at 21 to an attaching device 19 is located on a strong bar 18 fixed at the center point 209 of the center connecting means 29 and 30. The attaching device 19 is adjustable up and down vertically along the strong bar 18 by a device that may be powered by electricity or compressed air to change angle of attack of the pair of airfoil-shaped hydrofoils 10 to increase the lifting force on the submersible electrical power generating structure 1 to balance an increase in the downward vector force resulting from an increased drag acting through a downward angled anchor line 3. Once the height of the anchor line's attachment device 19 has been adjusted to provide the proper leverage to the strong bar 18, the changing angle of attack of the hydrofoils 10 will, without any parts moving, increase the lifting force to balance the increasing downward vector force resulting from increases in drag on the anchor line 3, thereby keeping the submersible generating plant 1 at a somewhat uniform depth. The submersible electrical power generating structure 1 is made of carbon fiber composites that do not corrode. Therefore, the submersible electrical power generating structure 1 in the current invention is capable of being free of service or replacement for many years. The submersible electrical power generating plant 1 in this invention is neither mounted on underwater structures nor suspended from any structure at water surface. The submersible electrical power generating plant is capable of generating electrical power from low speed current flow when equipped with larger turbine rotors 16 and 28 in relation to the size of the generators 58 and with additional gearing at 54. The submersible electrical power generating plant is capable of conveying kinetic energy by the pair of side-by-side counter-rotating full-bladed water turbine rotors 16 and 28 through either the first electrical power generator 58 or the second electrical power generator.

Figure 4:
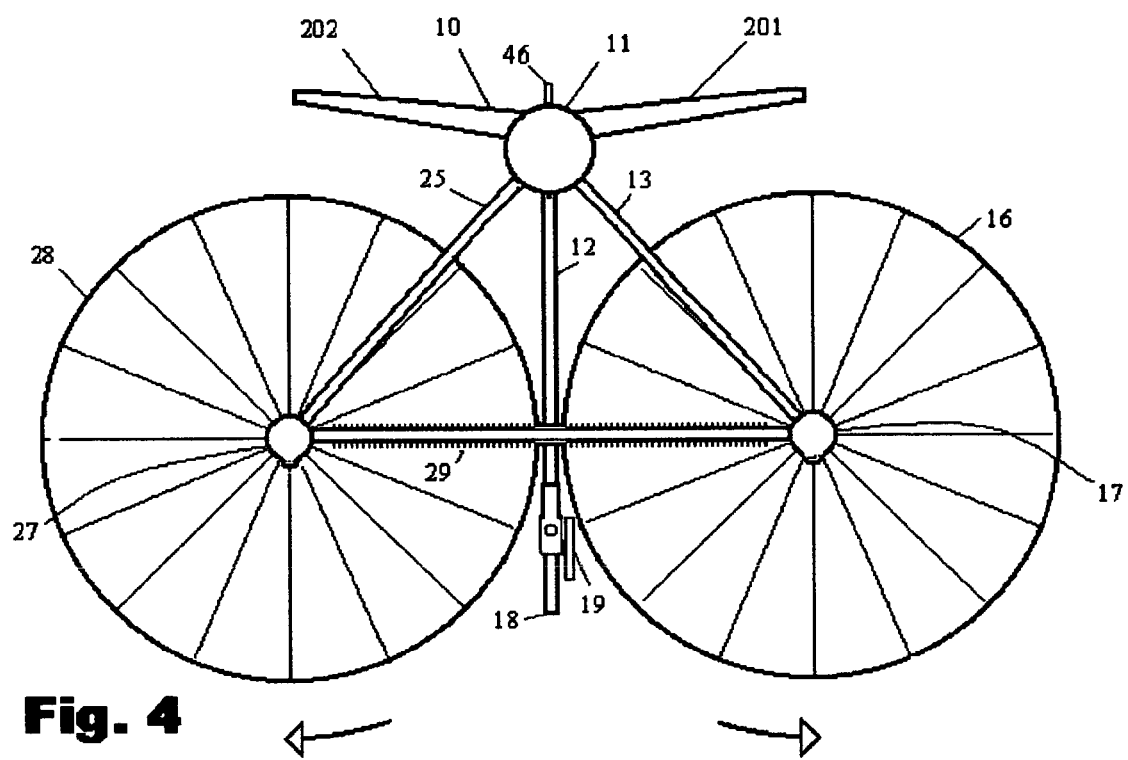
FIG. 4 is a front view of the submersible electrical power generating structure in FIG. 3.

FIG. 4 shows the front elevation of the submersible electrical power generating device 1 shown in FIGS. 2 and 3. FIG. 5 is a drawing of the inside of the nacelles 17 and 27 in FIGS. 2 and 3. The first water turbine rotor 16 and 28 turns a first low-speed shaft 53 with great torque. A first gearbox 54 containing planetary and helical gears converts the low speed to high speed to drive a first high-speed shaft 55 the shaft speed required by a compact 4 or 6-pole generator 58 to produce 60-cycle current. An eddy current clutch (or an electronically controlled break) 56 makes the connection between the first high speed shaft 55 and 57 to get the RPM of the first electrical power generator 58 synchronized with the 60-cycle current to drive the first electrical power generator 58. The invention may be modified to produce the same amount of electricity from low current velocities by increasing the diameter of the pair of side-by-side counter-rotating full-bladed water turbine rotors 16 and 28 and by increasing the gearing in the first gearbox 54 in first watertight nacelles 17 and 27 in FIGS. 2 and 3. At the bottom of each of the nacelles is a float operated sump pump 59. Since the second watertight nacelle 27 is a mirror image of the first watertight nacelle 17, the second watertight nacelle 27 has a similar structure as the first watertight nacelle 17. All the first gear box 54, the second gear box, the first low-speed shaft 53, the second low-speed shaft, the first high-speed shaft 55, the second high-speed shaft, the first electrical power generator 58 and the second electrical power generator are lubricated and cooled by oil. A sump pump 59 is located at the bottom of the watertight nacelle to remove any water.

Figure 6:
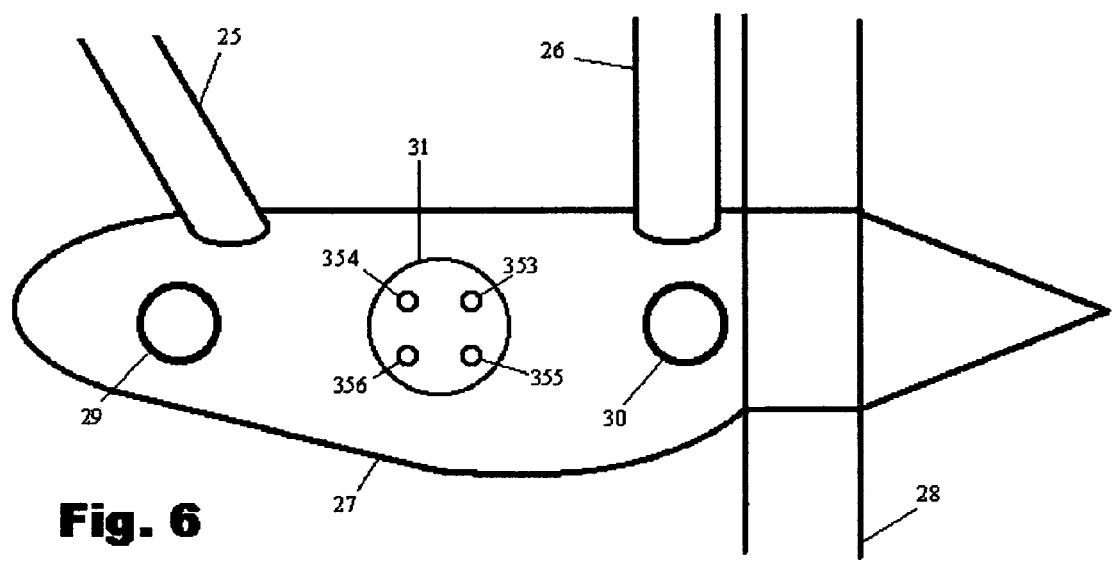
FIG. 6 is a cross section view of a nacelle with heat exchanger in FIG. 3.

Referring now to FIG. 6, which is a view of the right nacelle 27 of the inventions shown in FIG. 2. The connecting members 25 and 26 connect the nacelle to the buoyancy tank, and connecting member 29 and 30 connect the right nacelle to the left nacelle 17. The heat exchanger 31 extends between the nacelles and contains four tubes 353, 354, 355 and 356. Tubes 353 and 354 remove the heat from the coolant for the generator in the left nacelle 17 and tubes 355 and 356 are to remove the heat from the coolant for the generator in the right nacelle 27.

Figure 7:
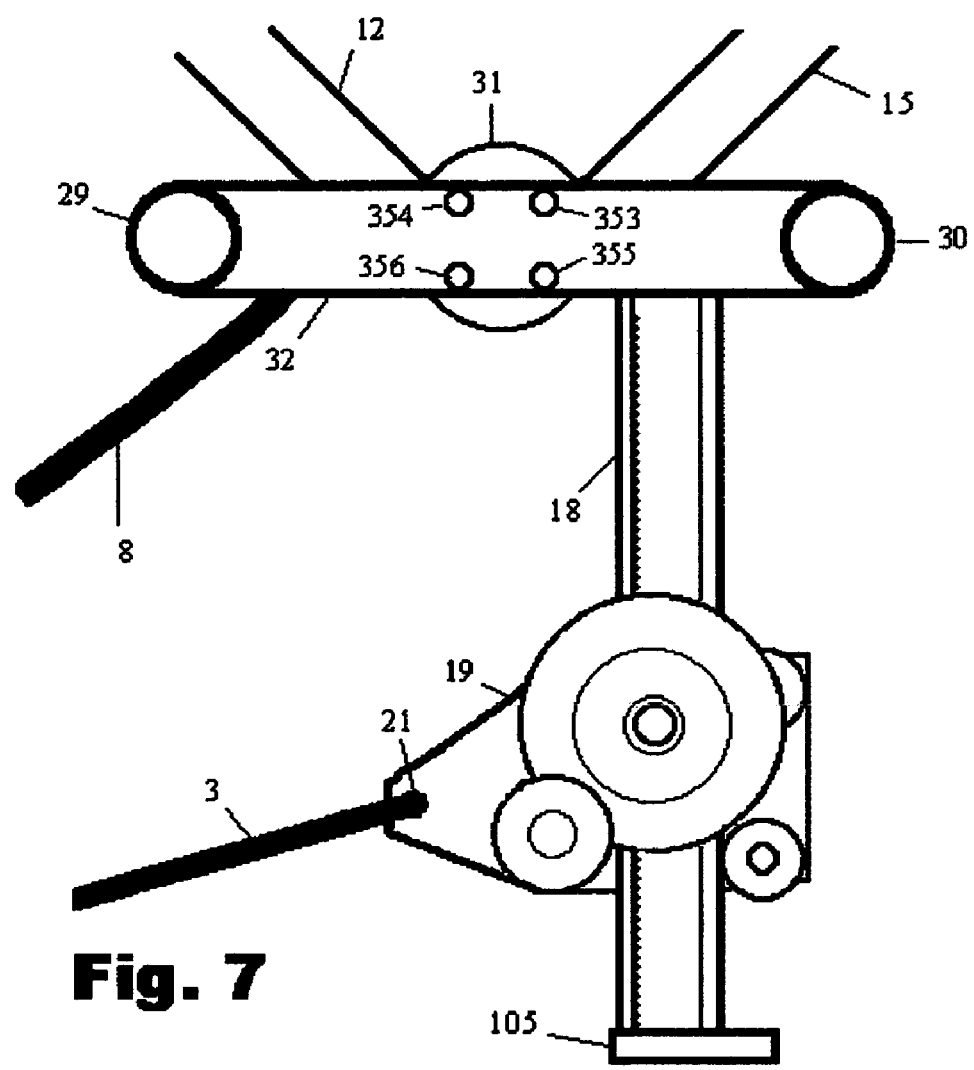
FIG. 7 is a cross section view of center structure in FIG. 2.

Referring now to FIG. 7, which is a view of the center support section of the inventions shown in FIG. 2. FIG. 7 shows the front diagonal connecting member 12 and the rear diagonal connecting member 15, the heat exchanger 31, the front crossing linking member 29, the rear cross linking member 30, the strong vertical bar 18 and the anchor line height adjusting device 19. Spanning between the linking members 29 and 30 is a wide center support section 32.

Figure 8:
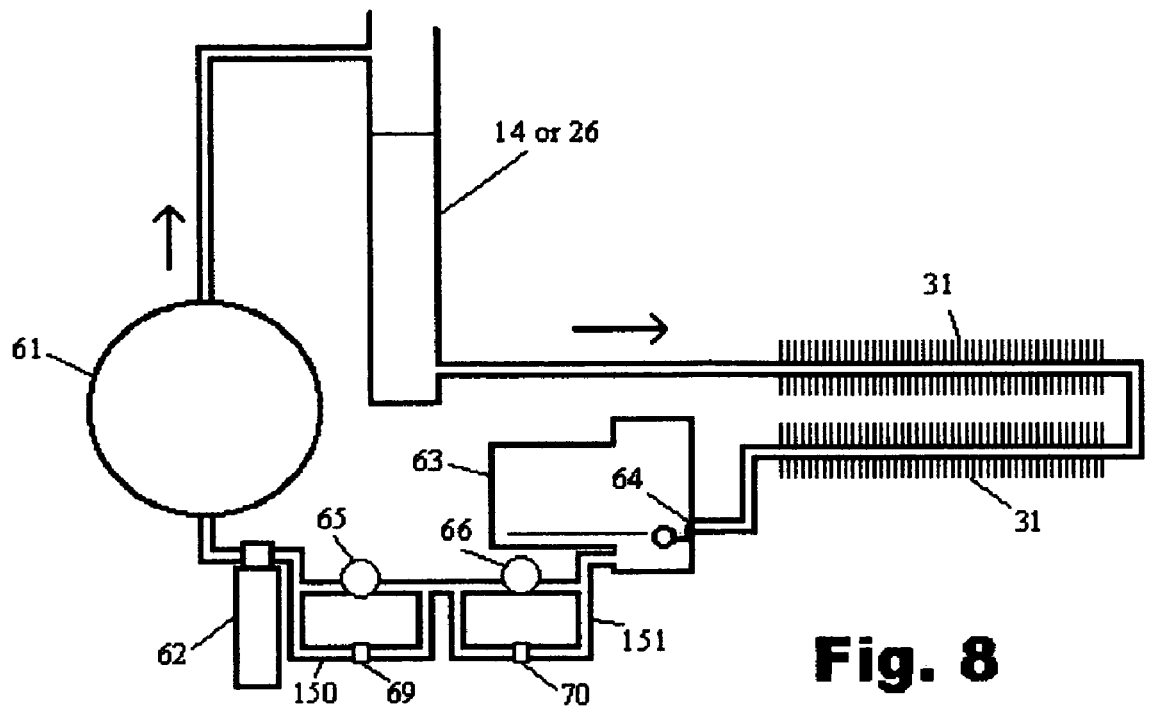
FIG. 8 is a schematic drawing of a liquid cooling system using the gearbox lubricating oil as coolant.

FIG. 8 is a schematic diagram of a cooling system that uses gearbox-lubricating oil as a coolant. The hot oil being pumped from the generator 61 moves into a vertical connecting member 14 or 26 that also serves as a standpipe. From the standpipe the oil flows twice through the heat exchanger 31, across to the other nacelle and back. The head pressure exerted by the standpipe 14 or 26 moves the oil into the gearbox 63, where the level is controlled by a float valve 64. The oil is constantly being pumped from the gearbox 63 by two pumps 65 and 66 that are in series to provide redundancy. Below the pumps 65 and 66 are lines 150 and 151 that will allow oil to by-pass a non-working pump. These lines are equipped with check valves 69 and 70 to prevent the oil from flowing in the wrong direction. The oil is then pumped under pressure through an oil filter 62 and back to the generator 61 to repeat the cycle.

Figure 9:
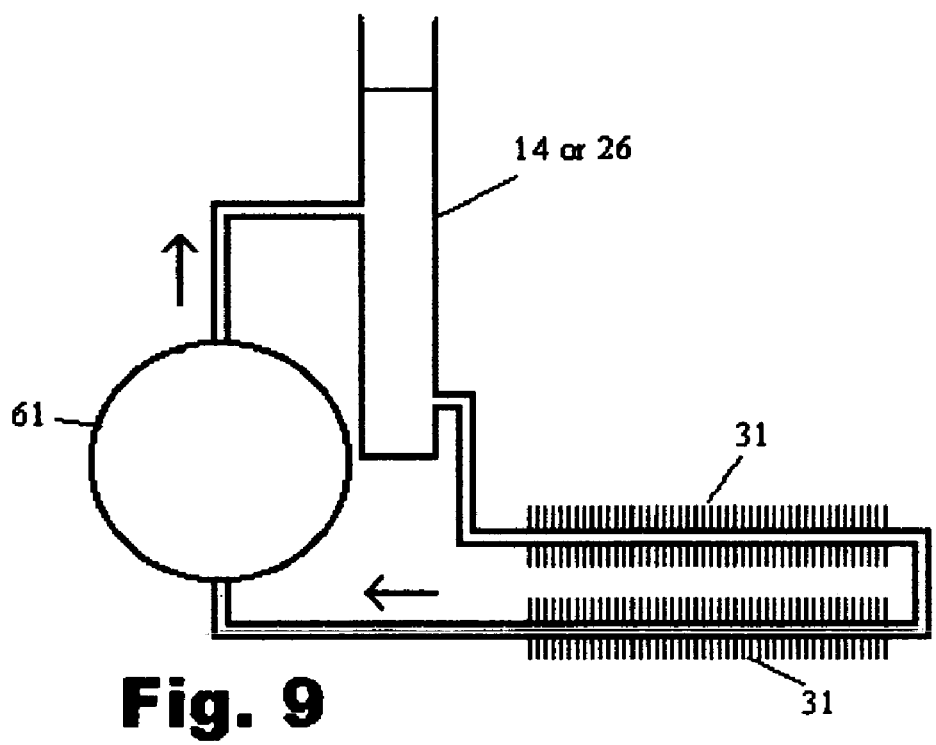
FIG. 9 is a schematic of a modification of the cooling system using convention to circulate coolant.

FIG. 9 is a schematic diagram of a modification of the system shown in FIG. 17 that uses a separate coolant that circulates without any moving parts because it uses convection. The generator 61 heats the coolant. The heated coolant, being lighter, rises in the vertical and enters the storage reservoir that serves as a standpipe in the connecting members 14 or 26. The coolant flows from the bottom of the standpipe through the heat exchanger 31 twice, across to the other watertight nacelle and back. The cooled coolant then enters the generator 61 to repeat the cycle.

Figure 10:
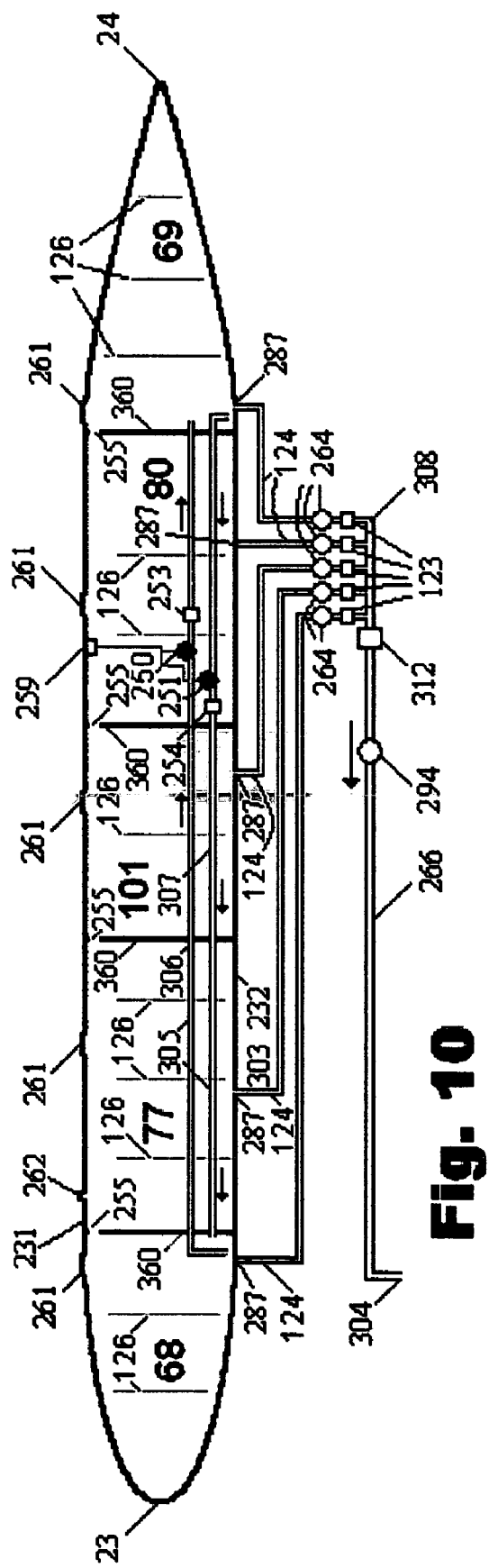
FIG. 10 is a schematic drawing showing the piping system for the submersible electrical power generating plants in FIG. 2.

FIG. 10 shows the piping system used to adjust the ballast in the buoyancy tank 11. Each of the five separate compartments 68, 77, 101, 80, and 69 have watertight hatches 261 located on the top side 231 of the streamlined torpedo-shaped buoyancy tank 11, through which measured quantities of ballast water can be added to each of the plurality of compartments 68, 77, 101, 80, and 69. There are vent holes 255 located at the tops of the bulkheads 360 to allow the air pressures in the plurality of compartments to equalize. There is a ballast water transfer piping system 305 that consists of a first part that contains pipes 306, a pump 250, a special check valve 253 that will not allow water to flow from the rear compartment 69 to the front compartment 68 and will not allow water to flow from the front compartment 68 to rear the rear compartment 69 if the pressure is not above a minimum, and a second part that contains pipes 307, a pump 251, a special check valve 254 that will not allow water to flow from the front compartment 68 to the rear compartment 69 and will not allow water to flow from the rear compartment 69 to rear the front compartment 68 if the pressure is not above a minimum. There is a pressure activated control switch 259 that controls the pumps 250 and 251.

If the hydrostatic water pressures become too high, the control switch 259 turns on the pump 250 to pump ballast water from the front compartment 68 to the rear compartment 69 to move the structure's center of gravity rearward, which will increase the angle of attack of the attached hydrofoils 10 to cause the submersible electric power generating structure to move higher. If the hydrostatic water pressures become too low, the control switch 259 will turn on the pump 251 that will pump water from the rear compartment 69 to the front compartment 68 to move the center of gravity forward to decrease the angle of attack of the attached hydrofoils 10 to cause the submersible electric power generating structure to move lower. There is a hose connection and valve 262 located on the top side 231 of the torpedo-shaped buoyancy tank 11 through which compressed air can be added to pressurize the air inside the plurality of compartments 68, 77, 101, 80, and 69 to an air pressure that is greater than the hydrostatic pressures at the operating depth. Each of the plurality of pressurized compartments is connected to a separate ballast water purging system that consists of drain holes 287, drain pipes 124, special valves 264 that will allow only liquid to flow through them and not air, and conventional valves 123. From each of the conventional valves 123, the separate pipes feed into a common pipe 266 to carry the exiting water to the front end of the streamlined torpedo-shaped buoyancy tank 11, where the pipe 266 turns to eject the ballast water forcibly downward at 304. Each of the plurality of compartments 68, 77, 101, 80, and 69 contains baffles 126 to reduce water movement.

The raising of a submersible electrical power generating plant 1 to the surface begins with conventional valves 312 and 123 closed. The valves 123 are opened varying amounts, with the valve 123 for the front compartment 68 being opened the most, the conventional valves 123 for the compartments 77, 101, 80, and 69 being opened by decreasing amounts, with the valve for the end compartment 69 being opened the least. After the conventional valves 123 have been opened to the varying degrees, valve 312 is opened to allow the pressurized air inside the plurality of compartments of the streamlined torpedo-shaped buoyancy tank 11 to push the ballast water down through the separate drain holes 287, separate drain pipes 124, separate special valves 264, separate conventional valves 123, into the common pipe 266, through the conventional valve 312, through the check valve 204, and forward in common pipe 266 to where the ballast water is ejected forcibly downward from the end of the common pipe 266 at 304. Opening the conventional drain valves 123 from the forward compartments more than for the rear compartments will cause the buoyancy at the front end 23 of the torpedo-shaped buoyancy tank 11 to increase faster than the buoyancy at the rear end 24 of the buoyancy tank 11. This increasing buoyancy at the front end 23 of the buoyancy tank 11, combined with the ballast water being forcibly ejected downward from the front end 23 will cause the front-end 23 of the buoyancy tank 11 to rise faster than the rear end 24 of the buoyancy tank 11, which will increase the angle of attack of the air-foil shaped hydrofoils 10, which will cause the submersible electrical power generating structure 1 move higher.

As the submersible electrical power generating plant is moving higher, the hydrostatic water pressures will decrease, which will further increase the pressure differences between the air pressures inside the streamlined torpedo-shaped buoyancy tank 11 and the hydrostatic pressures outside, which, in turn, will increase the velocity of the ballast water discharge. The submersible electrical power generating plant 1 will rise to the surface, where it will float with the buoyancy tank 11 high in the water. If the plurality of compartments 68, 77, 101, 80, and 69 are not completely empty of all ballast water, the compartments 68, 77, 101, 80, and 69 can be emptied by injecting compressed air into the compartments through the hose connection and valve 262 that is on the top side 231 of the torpedo-shaped buoyancy tank 11. Check valve 294 in the common pipe 266 is to prevent water from flowing back through the pipe 266 to flood the plurality of compartments should the air pressures inside the torpedo-shaped buoyancy tank 11 be allowed to depressurize while the submersible electrical power generating plant 1 is floating at the surface 2. All of the conventional valves 123 must be closed before ballast water are again placed into the plurality of compartments 68, 77, 101, 80, and 69 to prevent ballast water from siphoning through the drain system because of differences in head pressures between the compartments.

Figure 11:
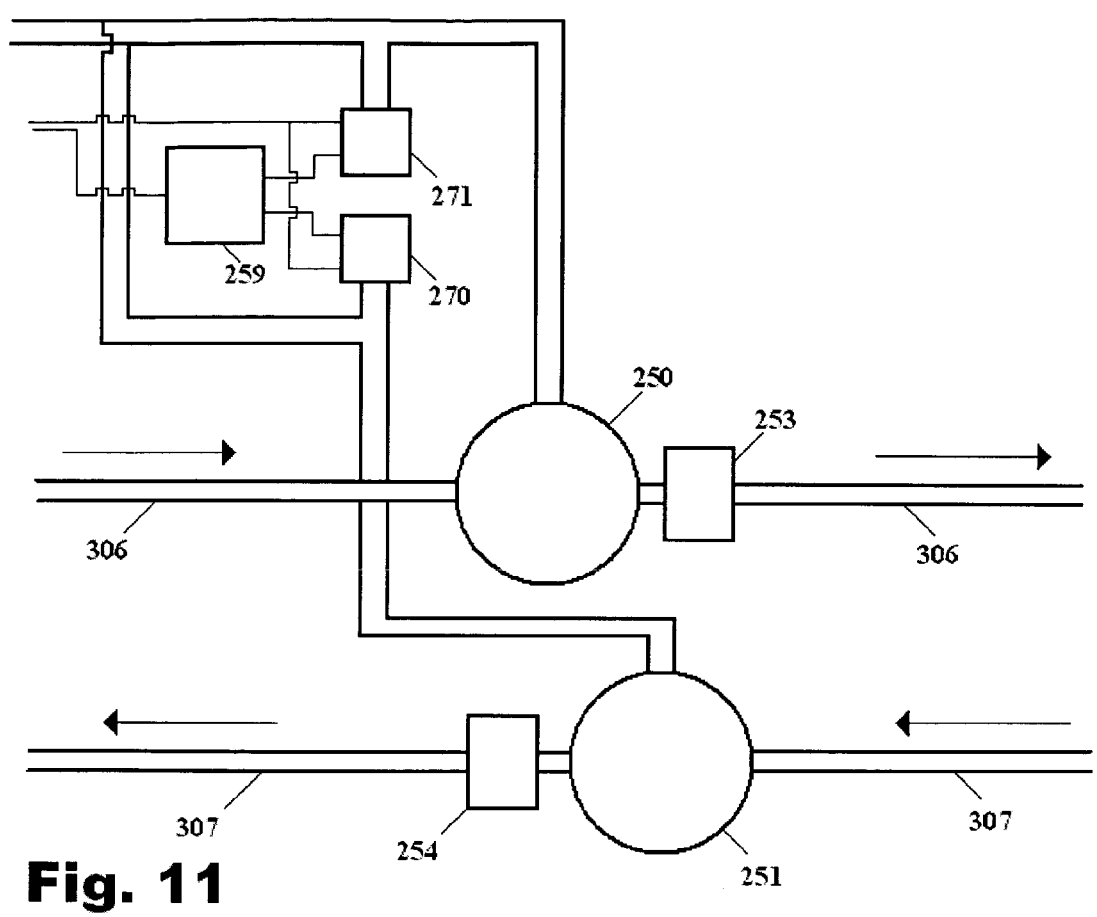
FIG. 11 is a schematic of the piping and wiring for the supplementary depth-control system that measures the hydrostatic pressures to control operating depths shown in FIG. 10 for the submersible electrical power generating power plants in FIGS. 2 and 14.

FIG. 11 is a schematic diagram of the wiring and piping systems for supplementary depth control system shown in FIG. 10 that is capable of transferring the ballast water between the front compartment 68 and the rear compartment 69 of the streamlined torpedo-shaped buoyancy tank 11 for the purpose of moving the center of gravity forward or rearward. If the hydrostatic water pressure is too high because the submersible electrical power generating structure 1 is too deep, the pressure switch 259 activates the solenoid 271 to turn on pump 250 to pump the ballast water from the front compartment 68 to the rear compartment 69 to cause the front end 23 of the torpedo-shaped buoyancy tank 11 to move higher and the rear end 24 of the torpedo-shaped buoyancy tank 11 to move lower, which will increase the angle of attack of the attached airfoil-shaped hydrofoils 10 to cause the submersible electrical power generating structure 1 to move higher.

If the hydrostatic water pressure is too low because the submersible electrical power generating structure 1 is too near the surface 2, the pressure switch 259 activates the solenoid 270 to turn on pump 251 to pump ballast water from the rear compartment 69 to the front compartment 68, which will cause the front end 23 of the torpedo-shaped buoyancy tank 11 to move lower and the rear end 24 of the torpedo-shaped buoyancy tank to move higher, which will decrease the angle of attack of the attached airfoil-shaped hydrofoils 10 to cause the submersible 1 to move lower. The special check valve 253 will not allow the ballast water to flow from the rear compartment 69 to the front compartment 68 and will not allow the ballast water to flow from the front compartment 68 to the rear compartment 69 unless the water pressure is above a minimum. The special check valve 254 will not allow the ballast water to flow from the front compartment 68 to the rear compartment 69 and will not allow the ballast water to flow from the rear compartment 69 the front compartment 68 unless the water pressure is above a minimum. The special check valves 253 and 254 will prevent ballast water from siphoning between the front compartment 68 and the rear compartment 69.

FIGS. 12*a* and 12*b* are drawings of the special check valve 253 shown in FIGS. 10 and 11 located in the ballast water transfer system 305. The transfer pipe system 305 being capable of transferring ballast water back and forth between the front compartment 68 and the rear compartment 69 of the torpedo-shaped buoyancy tank 11. The ballast water transfer system 305 contains two piping systems. The first pipe system is comprised of pipe 306, the pump 250, and the special check valve 253 that prevents ballast water from flowing from the rear compartment 69 to the front compartment and will not allow ballast water to flow from the front compartment 68 to the rear compartment 69 unless the pressure is above a minimum. The special valve 253 is located in pipe 306 on the side of the pump 250 that receives water under pressure from the pump 250. The special check valve 253 consists of a valve housing 261 that has a valve seat 43 at the bottom of the valve housing 261 that contains an intake port 276 located at the center of the hemispherically-shaped valve seat 43. The special valve also consists of an outlet port 277, and a heavy ball 275 within the valve housing 261. The heavy ball 275 is capable of fitting snuggly within the valve seat 43. FIG. 12a shows the heavy ball 275 resting in the valve seat 43. The heavy ball 275 covers the intake port 276 to prevent the ballast water from flowing from 282, through the special valve 253, to 278. The heavy ball 275 also does not allow the ballast water from siphoning through the transfer pipe 306 from the front compartment 68 the rear compartment 69 of the torpedo-shaped buoyancy tank 11, this siphoning being caused by the differences in the head pressures between the front compartment 68 and the rear compartment 69.

FIG. 12b shows how the higher water pressure produced by pump 250 pushes the ballast water through the intake port 276 with enough force to push the heavy ball 275 from the hemispherically-shaped valve seat 43 to allow the water to flow out through the outlet port 277 to permit the ballast water to be transferred under pressure from the front compartment 68 to the rear compartment 69. The water transfer system 307 is similar to the water transfer system 306, though reversed to transfer the ballast water from the rear compartment 69 to the front compartment 68 of the torpedo-shaped buoyancy tank 11.

FIG. 13a and FIG. 13b are drawings of one of the separate special valves 264 that is at the end of each of the separate drain pipes 124 shown in FIG. 10 capable of draining each of the separate compartments 68, 77, 101, 80, and 69. The special valve consists of a buoyant ball 265 that is contained in a special valve housing 264. The special valve housing 264 has in inlet 49 from the drain pipe 124 and an outlet hole 276 located in the center of a base 46 of the special valve housing 264. FIG. 13a shows the special valve 264 when the conventional valve 123 is open to allow ballast water to be forced from the plurality of compartments 68, 77, 101, 80, and 69 by the compressed air is the same in the plurality of compartments. When water is inside the special valve housing 264, the buoyant ball 265 floats at the top of the special valve housing 264 and allows the ballast water to flow from the drain pipe 124, through the inlet 49, into the special valve housing 264, and out the outlet 279. FIG. 13b shows the special valve after all the water has been expelled from the buoyancy tank compartment. As the pressurized air replaces the water inside the special valve housing 264, the buoyant ball 265 drops into the base 46 of the special valve housing 264, where the buoyant ball 265 covers the outlet hole 276 to stop the outflow of pressurized air.

Figure 14A:
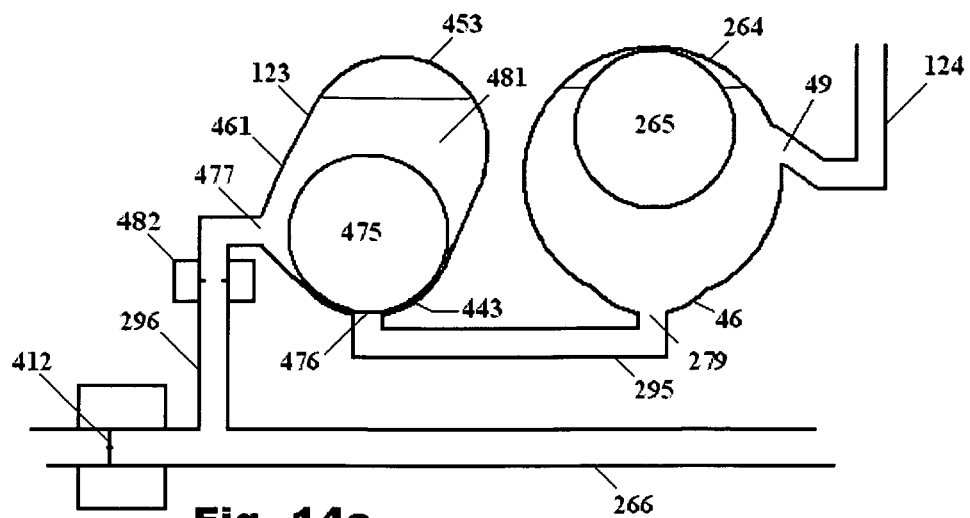
FIG. 14*a* is a first depiction of a water purging system of the present invention showing a purging valve closed and a heavy ball blocking an inlet to prevent water from siphoning between buoyancy tank compartments.
Figure 14B:
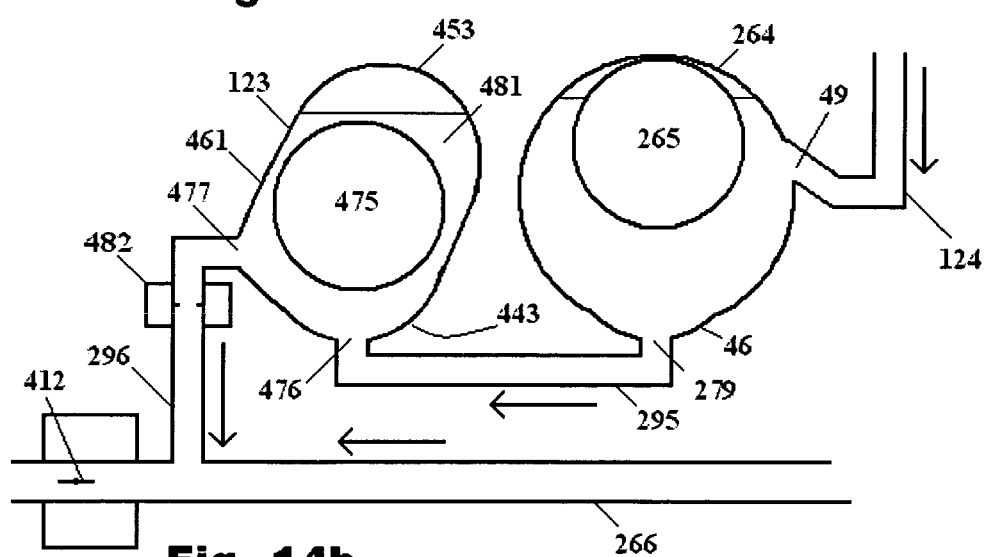
FIG. 14*b* is a second depiction of a water purging system of the present invention showing a purging valve open and the pressure of the exiting water lifting a heavy ball to allow water to pass through the system.
Figure 14C:
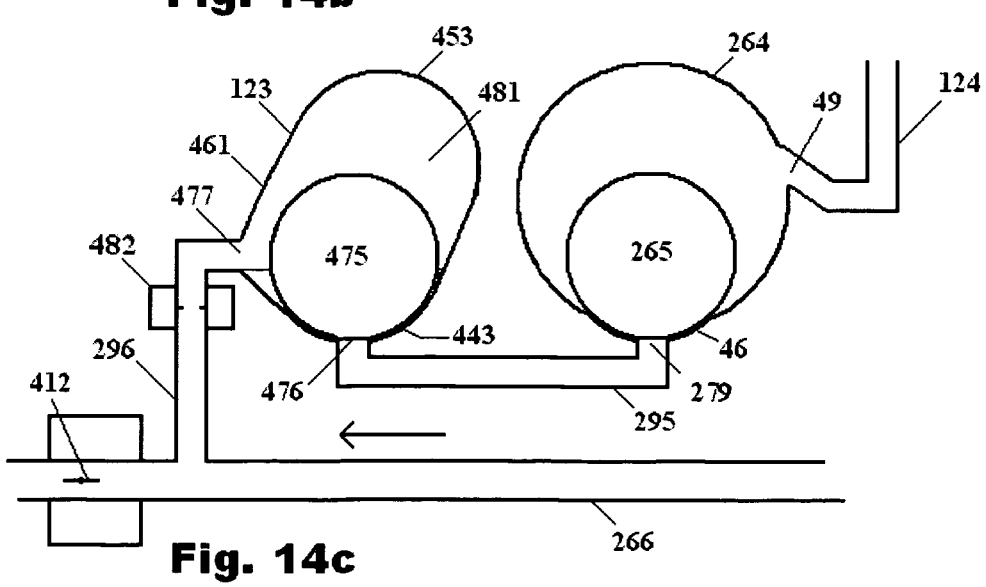
FIG. 14*c* is a third depiction of a water purging system of the present invention showing a compartment drained of water and the buoyant ball dropped to the bottom of the special valve to stop the air flow to conserve pressures to empty the water from other compartments.

Referring now to FIGS. 14a, 14b, and 14c, the noted drawings are of a pressurized ballast water purging system that replaces the conventional valves 123 with special check valves 453, which can be identical to the special check valve 253 and 254 in the ballast water transfer system 305. Special valves 264 remain. Conventional valve 312 is replaced by electrically controlled valve 412 capable of being operated from a distant location. FIG. 14a shows the valves while the submersible electrical power generating plant is operating at depth. The valve's inlet 49 enters at an upward angle to prevent incoming air flow from blowing the buoyant ball 265 off the valve outlet 279. Reference FIG. 16b. When the electrically controlled valve is open, the pressurized air in the torpedo-shaped buoyancy tank forces the ballast water from each separate compartments 68, 77, 101, 80, and 69, through the drain pipes 124, through the special valve 264, through the valve outlet 279, through the pipe 295, through the special check valve 453 with sufficient force to lift the heavy ball 475 from the special check valve inlet 476, through the special check valve 453, through pipe 296 to the common pipe 266 that contains the electrically controlled valve 412.

FIG. 14c shows the special check valve and the special valve after the ballast water has been drained from the compartment of the torpedo-shaped buoyancy tank. The special valve 264 is empty of water and the buoyant ball 265 is covering the special valve's outlet 279 to prevent pressurized air from passing through the special valve outlet 279. Because no water is passing through the pipe 295, the heavy ball 475 covers the valve inlet 476 of the special check valve 453. The simultaneous opening of the electrically controlled valves 412 of all of the submersible electric power generators within a group can cause the group of submersible electrical power generating plants to simultaneously ascend to the surface, with the underwater electricity extension cable 4 still connected to the underwater linking cable 43, and while the submersible power plants are still generating power. Valves 482 in the pipes 296 controls the discharge rates for the ballast water from said compartments 68, 77, 101, 80, and 69, with said valves 482 being opened by decreasing amounts, with said valve 482 for said front compartment 68 being opened the most and said valve 482 for said rear compartment 69 being opened the least.

Figure 15:
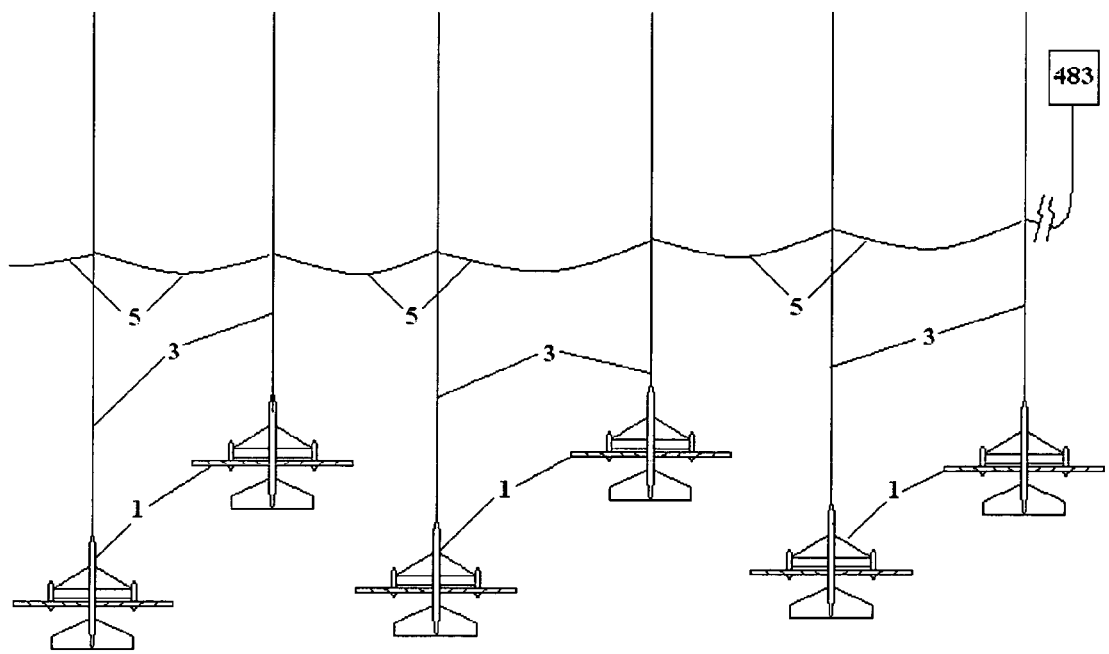
FIG. 15 is a top view depiction of six submersible electrical power generating plants attached to anchor lines, which lines are attached to power transmitting cable.
Figure 16A:
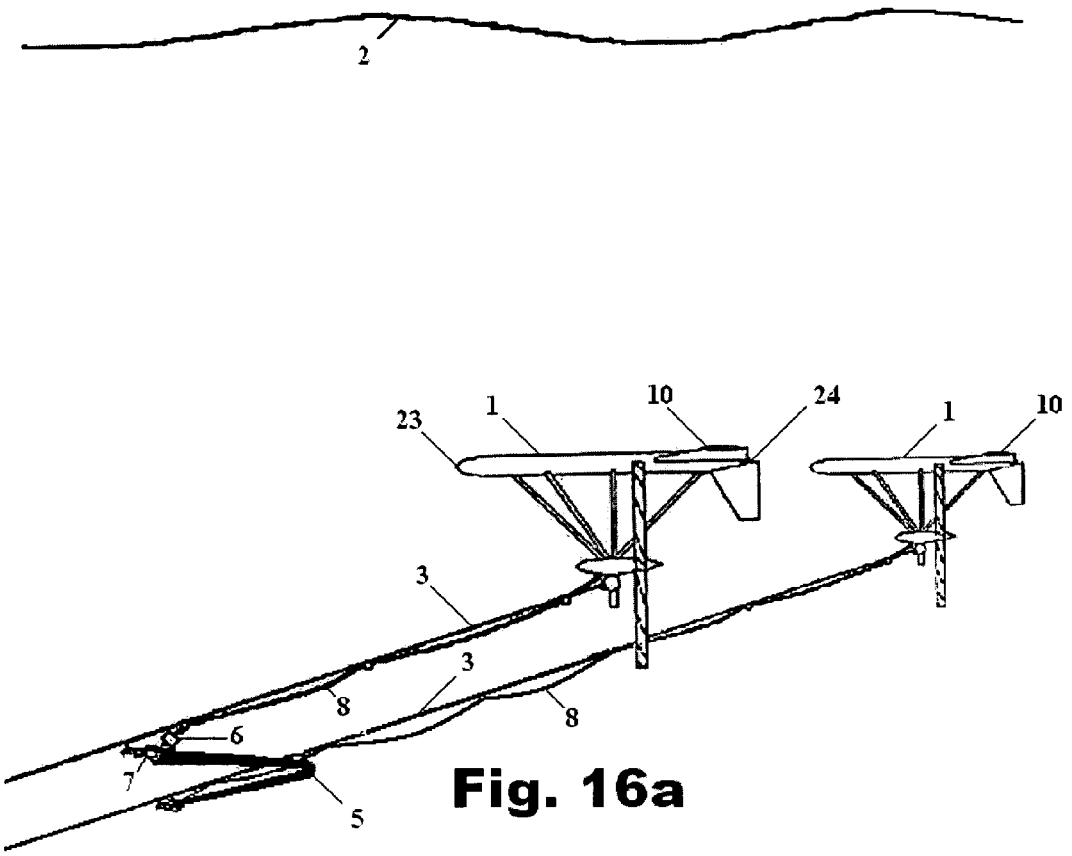
FIG. 16*a* is a depiction of two submersible electrical power generating plants within a group of said electrical power generating plants at operating depth below a water surface and attached to a power transmitting cable.
Figure 16B:
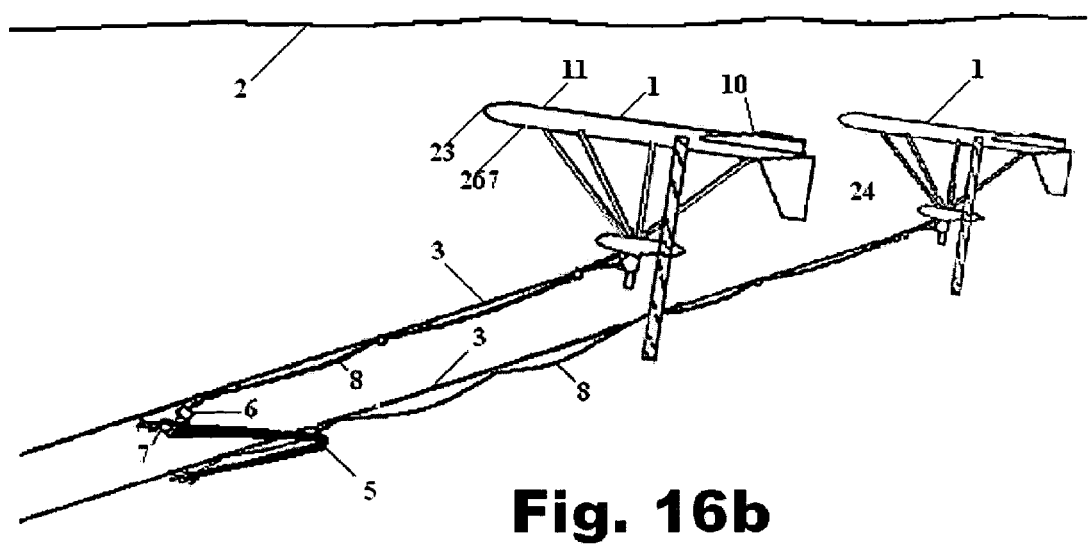
FIG. 16*b* is a depiction of the two submersible electrical power generating plants shown in FIG. 16*a* being raised to the water surface using the ballast water purging system detailed in FIGS. 10, 13*a*, 13*b*, 14*a*, 14*b*, and 14*c*.

FIG. 15 shows a top view six submersible electrical power generating plants 1 attached to the anchor lines 3. Electrical connecting cable 5 is attached to the bottom of said anchor lines 3. FIGS. 16a and 16b show two submersible electrical power generating plants 1 within a group of said electrical power generating plants that is being simultaneously raised to the surface 2 while attached to said electricity collecting cable 5. FIG. 16a shows two submersible electrical power generating plants 1 at operating depth below the water's surface 2. FIG. 16b is a drawing of the two submersible electrical power generating plants shown in FIG. 16a being raised to the surface 2 using the ballast water purging system shown in FIGS. 10, 13a, 13b, 14a, 14b, and 14c that is set to expel the ballast water faster from the front end 23 of said buoyancy tank 11 than said rear end 24 by said valves 482 being opened by varying amounts, with said valve 482 for said front compartment 68 being opened the most and said valves 482 for said compartments 77, 101, 80, and 69 being opened by decreasing amounts.

According to important features of the current invention, the electric power generating plant has been carefully configured to utilize the kinetic energy of the current to adjust the hydrofoils lifting force to balance the downward vector force caused by the kinetic energy of the current acting on the downward angled anchor line. A further feature of the current invention is that the electric power generating plant utilizes the hydrostatic pressures to control the movement of the center of gravity of the invention to adjust the hydrodynamic lifting forces to keep the electric power generating plant operating within any preset range of depths. A further feature of the current submersible electric power plant invention is that it makes possible their efficient installation and recovery.

It will thus be seen that the present invention discloses a submersible electrical power generating plant for generating electrical power with low or no fuel cost from the flow of ocean current. The submersible electrical power generating plant preferably comprises a submersible electrical power generating structure; a pair of side-by-side counter-rotating full-bladed water turbine rotors; a pair of watertight nacelles; a depth control system; and a drain system. The power generating structure preferably has a superior located center of buoyancy, an inferior located center of gravity, a center of drag, a streamlined torpedo-shaped buoyancy tank. The buoyancy tank comprises a nose end, a rear end, a top side, a bottom side, a left side, a right side, a plurality of valves, a plurality of compartments, a vertical tail fin capable of improving directional stability of the submersible electrical power generating structure, and a pair of airfoil-shaped hydrofoils.

The airfoil-shaped hydrofoils have a first airfoil-shaped hydrofoil and a second airfoil-shaped hydrofoil, the first airfoil-shaped hydrofoil being a mirror image of the second airfoil-shaped hydrofoil. The first airfoil-shaped hydrofoil is fixed on the left side of the streamlined torpedo-shaped buoyancy tank projecting horizontally leftward and the second airfoil-shaped hydrofoil is fixed on the right side of the streamlined torpedo-shaped buoyancy tank projecting horizontally rightward. The pair of airfoil-shaped hydrofoils is located at the rear end of the streamlined torpedo-shaped buoyancy tank, and is capable of providing the submersible electrical power generating structure with more lift and less drag at high angle of attack when the leading edges of the hydrofoils are higher than the trailing edges in relation to the flow of water.

The water turbine rotors comprise a first water turbine rotor and a second water turbine rotor, the first water turbine rotor being a mirror image of the second water turbine rotor. The first water turbine rotor has a first horizontal water turbine axis parallel to the streamlined torpedo-shaped buoyancy tank and a plurality of first rotor blades, the plurality of first rotor blades extending radially outward from the first horizontal water turbine axis. Similarly, the second water turbine rotor has a second horizontal water turbine axis parallel to the first horizontal water turbine axis and a plurality of second rotor blades, the plurality of second rotor blades extending radially outward from the second horizontal water turbine axis. The water turbine rotors are preferably located beneath the streamlined torpedo-shaped buoyancy tank and face the rear end of the streamlined torpedo-shaped buoyancy tank.

The pair of watertight nacelles comprise a first watertight nacelle and a second watertight nacelle, the first watertight nacelle connecting to the first horizontal water turbine axis and the second watertight nacelle connecting to the second horizontal water turbine axis. Both the first watertight nacelle and the second watertight nacelle are firmly connected to each other through certain center connecting means, the center connecting means having an up side, a down side and a center point. The center point is preferably located below and slightly forward of the center of drag of the submersible electrical power generating structure. The center connecting means are preferably securely mounted to the bottom side of the streamlined torpedo-shaped buoyancy tank through certain third connecting means, the third connecting means being long enough to ensure the submersible electrical power generating structure has the center of buoyancy located above the center of gravity.

The first nacelle is securely mounted to the bottom side of the streamlined torpedo-shaped buoyancy tank through a first connecting means, and the second nacelle being securely mounted to the bottom side of the streamlined torpedo-shaped buoyancy tank through a second connecting means. The first nacelle has a first low-speed shaft connecting to the first horizontal water turbine axis, a first gear box connecting to the first low-speed shaft capable of converting low speed to high speed, a first high-speed shaft connecting to the first gear box, and a first electrical power generator driven by the high speed shaft capable of generating electrical power. The second watertight nacelle has a second low-speed shaft connecting to the second horizontal water turbine axis, a second gear box connecting to the second low speeding shaft capable of converting low speed to high speed, a second high-speed shaft connecting to the second gear box, and a second electrical power generator driven by the second high-speed shaft capable of generating electrical power. The pair of watertight nacelles is located sufficiently far apart to provide clearance for the pair of side-by-side counter-rotating full-bladed water turbine rotors. The center connecting means preferably have a cooling system capable of effectively and efficiently distributing heat generated by the first gear box, the first electrical power generator, the second gear box and the second electrical power generator to outside water.

An attaching device may be located at the center point of the center connecting means, which device is vertically adjustable. The attaching device may be powered by electricity or compressed air to adjust the distance between the attaching device and the center of drag to obtain the required leverage for the pull on the anchor line to rotate the submersible electrical power generating structure to adjust the angle of attack of the pair of airfoil-shaped hydrofoils to approximately balance changes in the downward vector force resulting form changes in the drag acting through a downward angled anchor line.

The supplementary hydrostatic-pressure depth-control system is preferably located within the streamlined torpedo-shaped buoyancy tank and comprises a pressure switch and a pipe system having two parts, the first part of the piping system to transfer ballast water from the front compartment to the rear compartment. The first part comprises a first set of pipes, a first pump, and a first special check valve capable of preventing the siphoning of ballast water. The second part transfers ballast water from the rear compartment to the front compartment. The second part comprises a second set of pipes, a second pump, and a second special check valve capable of preventing the siphoning of ballast water. The first and second pumps are controlled by the pressure switch capable of being activated by the hydrostatic water pressures being outside of preset limits. In this regard, the first pump transfers the ballast water from the front compartment to the rear compartment if the hydrostatic pressure goes above a preset limit, and the second pump to transfer ballast water from the rear compartment to the front compartment if the hydrostatic pressures goes below a preset limit.

The ballast water purging system is cooperatively associated with the torpedo-shaped buoyancy tank and preferably comprises a plurality of drain holes, separate pipes, separate special valves that permit only liquid to pass, separate conventional valves, and a common master conduit or pipe that goes to the front end of the streamlined torpedo-shaped buoyancy tank where the common pipe turns downward at a right angle downward. The plurality of compartments in the streamlined torpedo-shaped buoyancy tank are separated by bulkheads, the bulkheads each having vent holes located near the top of the bulkheads, the streamlined-torpedo-shaped buoyancy tank has a valve through which the plurality of compartments are capable of being pressurized.

An electrical power collection and transmission structure may thus be connected to the submersible electrical power generating structure for collecting and transmitting electrical current therefrom.

It will thus be understood that the submersible electrical power generating plant has a number of features as set forth in varying degrees hereinafter. For example, the plant is capable of being free of service or replacement for many years. The submersible electrical power generating plant comprises a center of gravity that can be changed vertically and longitudinally by adding water into or subtracting water from the streamlined torpedo-shaped buoyancy tank. The submersible electrical power generating plant is neither mounted on underwater structures nor suspended from any structure at water surface. The submersible electrical power generating plant is capable of generating electrical power from low speed current flow when equipped with larger turbines and/or smaller generators and more gearing. The submersible electrical power generating plant may have a vertical tail fin located on either the top side of the submersible electrical power generating structure extending upward or the bottom side of the submersible electrical power generating structure extending downward.

The submersible electrical power generating plant is capable of conveying kinetic energy by the pair of side-by-side counter-rotating full-bladed water turbine rotors through either the first electrical power generator or the second electrical power generator. The submersible electrical power generating plant may be constructed from carbon fiber composites and other plastics. The submersible electrical power generating plant may have water turbine rotors that are sufficiently hollow so that their density is near that of the water displaced by the pair of side-by-side counter-rotating full-bladed water turbine rotors. The submersible electrical power generating plant may have water turbine rotors that turn so that both the plurality of first blades and the plurality of second blades are moving downward at the center of the submersible electrical power generating plant and upward on the outside of the submersible electrical power generating plant.

The first gear box, the second gear box, the first low-speed shaft, the second low-speed shaft, the first high-speed shaft, the second high-speed shaft, the first electrical power generator and the second electrical power generator may be lubricated and cooled by oil. The generators may be cooled with a coolant of any liquid or gas. Both the first electrical power generator and the second electrical power may have many poles to permit both the first electrical power generator and the second electrical power to produce sixty-cycle electric current from low shaft speeds.

The rotor blades of the submersible electrical power generating plant can be either wide or narrow, and can be of either a fixed or variable pitch. The submersible electrical power generating plant wherein the plurality of rotor blades, mounted on a horizontal axis, can be of any design.

The submersible electrical power generating plant has an electrical switch that is activated by the hydrostatic water pressures to adjust the hydrodynamic lifting forces to keep the submersible electrical power generating plant within any range of depth. The electrical switch may be activated by the hydrostatic water pressures to adjust the hydrodynamic lifting forces by means of movable canards, hydrofoils, fins, or flaps, or by means of adjusting the leveraged drag forces by raising and lowering the anchor line attachment point.

The submersible electrical power generating plant requires no site preparation and can be used at sites having uneven bottom topography. The submersible electrical power generating plant is virtually immune to damage from violent storms, earthquakes, and terrorist attacks. The submersible electrical power generating plant has systems for controlling operating depth that are immune to failure due to the growth of algae, encrusting marine fauna, and due to other foreign material.

The submersible electrical power generating plant has extremely low parasite drag (that drag that is not from producing power or lift). The submersible electrical power generating plant can have low capital costs per kilowatt of generating capacity. The submersible electrical power generating plant is virtually invisible from above the water. The submersible electrical power generating plant will produce no audible sounds above the water.

The submersible electrical power generating plant can produce electricity for producing hydrogen at locations reachable by wires. The submersible electrical power generating plant can save natural gas and other fossil fuels by replacing the power that is generated by fossil-fuel plants. The submersible electrical power generating plant can generate electricity without emitting carbon dioxide or other pollutants into either the atmosphere or water. The submersible electrical power generating plant can generate electricity from ocean currents while causing virtually no harm to sea animals. The submersible electrical power generating plant can produce electric power useable to charge batteries of electric powered vehicles and "plug-in" hybrid-powered vehicles.

The submersible electrical power generating plant, when well-placed in the central axis of the Gulf Stream off the east coast of South Florida, can operate with capacity factors comparable to those of many fossil-fuel-fired power plants. The submersible electrical power generating plant, when well-placed in the central axis of the Gulf Stream off the east coast of South Florida, can operate with capacity factors three times higher than those of most well-placed wind turbines. The submersible electrical power generating plant, when well-placed in the central axis of the Gulf Stream off the east coast of South Florida, can operate with capacity factors more than ten times higher than those of most well-placed tidal water turbines.

The submersible electrical power generating plant can be mass-produced off site. The submersible electrical power generating plant in claim 1 can be installed easily and efficiently by linking it with other submersible electrical power generating plants in long strings while the submersible electrical power generating plants are floating at the surface. The submersible electrical power generating plant is capable of being submerged simultaneously with many other submersible electrical power generating plants by simply turning on the electricity from the grid that magnetizes the generators' stators and activates the supplementary depth control system that is controlled by hydrostatic pressure.

The submersible electrical power generating plant is unaffected by corrosion caused by electro-chemical reactions or by electrolysis. The submersible electrical power generating plant, when well placed in the Gulf Stream, is capable of producing steady electric power at about one-third the cost of that unsteady and unreliable electric power produced by wind power at good wind-sites and about one-thirtieth of those costs of producing electricity with wind turbines that would be located in the southeastern states. The submersible electrical power generating plant can be raised to the surface by opening valves.

The submersible electrical power generating plant, after being raised to the surface, will have no ballast water in torpedo-shaped buoyancy tank. The submersible electrical power generating plant produces the lifting forces from buoyancy, hydrodynamic lift, and jet propulsion to lift a electrically disconnected generating structure to the surface.

The submersible electrical power generating plant, being tethered, can operate far above the ocean floor without requiring a bottom weight. The submersible electrical power generating plant is self-supported at preset depths by forces produced by buoyancy and hydrodynamic lift.

The submersible electrical power generating plant, being tethered, can operate in the faster flowing water that is far above the ocean floor without producing tipping moments (which are equal to the horizontal drag, multiplied by the height of that drag above the ocean floor).

The submersible electrical power generating plant, if covered with antifouling paint and operating in a steady and strong current, will have virtually no growth of algae on its exposed surfaces. However, even with a heavy growth of algae, the algae will have virtually no affect on operating efficiency.

The submersible electrical power generating plant may self adjust the lifting forces to balance the changing downward vector forces to remain within a narrow depth range. The submersible electrical power generating plant is capable of controlling precisely operating depth without relying on a bottom weight or other physical connection to the sea floor (other than the anchor line). The submersible electrical power generating plant will maintain a constant operating depth in mono-directional currents that can have small changes in direction.

The submersible electrical power generating plant is equipped with rotor blades having densities near that of the water they displace to eliminate all but the longitudinal forces on bearings of the slow speed shaft. The submersible electric power generating plant has great lateral stability. The submersible electric power generating plant is capable of being easily removed from operating depth.

The submersible electric power generating can be equipped with either one pair or two pairs of hydrofoils. The submersible electric power generating plant has a center of hydrodynamic lift (that lift provided by the hydrofoils) located behind the submersible electric power generating structure's axis of vertical rotation. The submersible electric power generating plant has hydrofoils that can be either horizontal or have dihedral.

The submersible electric power generating plant can be constructed of virtually any material, and can be assembled while on the surface into long lines consisting of many other submersible electric power generating plants.

The submersible electric power generator plant may comprise a system that, prior to submersion, keeps the structure's center of gravity to the rear of the structure to increase the hydrodynamic lift. The submersible electric power generator plant may comprise a system that, during the submersion process, moves the structure's center of gravity forward to reduce the hydrodynamic lift to that amount required to achieve and maintain a preset depth. The submersible electric power generator plant may be equipped with any type of generator.

While the above description contains much specificity, this specificity should not be construed as limitations on the scope of the invention, but rather as an exemplification of the invention. For example, as is described hereinabove, it is contemplated that the present invention essentially discloses a submersible electrical power generating plant for generating electrical power from ocean current, the submersible electrical power generating plant essentially comprising a submersible electrical power generating structure, an elongate buoyancy tank, a pair of water turbine rotors, a pair of watertight nacelles, a power collection and transmission structure, and a depth-control system all as substantially heretofore described.

The power generating structure essentially comprises a superior located center of buoyancy, an inferior located center of gravity, and a center of drag. The buoyancy tank comprises a nose end, a rear end, a top side, a bottom side, a left side, a right side, a front compartment, a rear compartment, and a drain system. The buoyancy tank is preferably located above and between the pair of water turbine rotors. The water turbine rotors each have a water turbine axis parallel to the buoyancy tank. The pair of watertight nacelles connect to the water turbine axes, and are interconnected with one another via certain center-connecting means.

The center-connecting means have an upside, a downside and a center point. The center point is preferably placed below and slightly forward of the center of drag. The center-connecting means are mounted to the bottom side of the buoyancy tank, in which is housed the depth-control system for transferring ballast water intermediate the front and rear compartments. The transferable ballast water functions to selectively raise or lower the front and rear ends. The drain system function to enable the user to selectively purge the buoyancy tank of ballast water for raising the power generating plant to a water surface.

The plant-surfacing means or drain system may preferably comprise a plurality of drain holes, a plurality of drain pipes, a plurality of water drain valves, and a master conduit. The drain pipes extend intermediate the master conduit and the drain holes. The water drain valves are cooperatively associated with the drain pipes for allowing ballast water to pass therethrough. The master conduit or common pipe directs piped ballast water away from the buoyancy tank. The front and rear compartments are preferably separated by bulkheads and comprise superior located vent holes. The front and rear compartments are pressurizeable via the superior located vent holes and certain pressurizing means. The pressurized front and rear compartments purge ballast water from the buoyancy tank via the drain system.

The depth control system comprises a pressure switch and a dual-direction pipe system. The dual direction pipe system comprises a first direction pipe assembly and a second direction pipe assembly. The first direction pipe assembly functions to transfer ballast water from the front compartment to the rear compartment and the second direction pipe assembly functions to transfer ballast water from the rear compartment to the front compartment. The first direction pipe assembly comprises a first set of pipes, a first pump, and a first check valve. The second direction pipe assembly comprises a second set of pipes, a second pump, and a second check valve. The first and second check valves prevent ballast water siphoning. The first and second pumps are controlled by the pressure switch, the pressure switch being actuable by hydrostatic water pressure. The first pump is operable for transferring ballast water from the front compartment to the rear compartment when the hydrostatic pressure goes above a first preset limit, and the second pump is operable for transferring ballast water from the rear compartment to the front compartment when the hydrostatic pressures goes below a second preset limit.

Still further, the present invention may be said to disclose certain methodology for transmitting electrical power from below a water surface to a power reception unit, the method comprising the steps of tethering at least one, but possibly several, power generating plants to certain power-transmitting means (as at 5), the power transmitting means being in communication with a power receiver (as at 483 in FIG. 15). It is contemplated that power receiver 483 may be an onshore power station or similar other power-receiving means. Each power generating plant comprises certain current-aligning means, certain depth-controlling means, and at least one pair of water turbine rotor assemblies. After tethering the plant to the power-transmitting means, the power-transmitting means and each plant may then be submerged below an ocean surface. After submerging the noted structures, the rotor assemblies are axially aligned with an ocean current via the current-aligning means and depth-controlling means as specified in more detail hereinabove. The water turbine rotors of the rotor assemblies may thereby be counter-rotated via the ocean current for generating electrical power. After electrical power is generated, the same may be transmitted to the power receiver via the power-transmitting means.

Should the application be practiced with a plurality of tethered power generating plants, it is contemplated that the same may be simultaneously submerged below the ocean surface, the power generating plants being spaced from one another along the power-transmitting means as generally depicted in FIGS. 15-16*b*. Given that the plants may preferably comprise certain plant-surfacing means, the power generating plants may be simultaneously surfaced via the plant-surfacing means for power generating plant maintenance and/or inspection when required. The plant-surfacing means may be defined by a pressurizeable drain system, the drain system being cooperatively associated with the buoyancy tank for purging the buoyancy tank of ballast water. Thus, the step of simultaneously surfacing the power generating plant(s) may comprise the step of purging ballast water from the buoyancy tank(s).

Noting also that the certain depth-controlling means enable the device to pursue certain depths, the step of axially aligning the paired water turbine rotor assemblies may comprise the step of transferring ballast water intermediate the front and rear compartments.

As various possible embodiments may be made in the above invention for use for different purposes and as various changes might be made in the embodiments and methods set forth, it is understood that all of the above matters here set forth or shown in the accompanying drawings are to be interpreted as illustrative and not in a limiting sense.

I claim:

1. A submersible electrical power generating plant for generating electrical power from ocean current, the submersible electrical power generating plant comprising:
a submersible electrical power generating structure, a streamlined, torpedo-shaped buoyancy tank, a pair of water turbine rotors, and a pair of watertight nacelles, the power generating structure comprising a superior located center of buoyancy, an inferior located center of gravity, and a center of drag, the buoyancy tank comprising a nose end, a rear end, a top side, a bottom side, a left side, a right side, a front compartment a rear compartment, a pair of airfoil-shaped hydrofoils, and a pressurizeable ballast water purging system, said pair of hydrofoils having a first hydrofoil and a second hydrofoil, said first hydrofoil being a mirror image of said second hydrofoil, said first hydrofoil fixed on said left side of said buoyancy tank projecting horizontally leftward and said second hydrofoil fixed on said right side of said buoyancy tank protecting horizontally rightward, said pair of hydrofoils located at said rear end of said buoyancy tank, said pair of hydrofoils capable of providing said submersible electrical power generating structure with more lift at high angles of attack when the leading edges of the hydrofoil is are higher than the trailing edges in relation to the flow of water, the buoyancy tank being located above and between the pair of water turbine rotors, the water turbine rotors each having a water turbine axis parallel to the buoyancy tank, the pair of watertight nacelles connecting to the water turbine axes, the pair of nacelles being interconnected via center-connecting, means, the center-connecting means having an upside, a downside and a center point, the center point being placed below and slightly forward of the center of drag, the center-connecting means being mounted to the bottom side of the buoyancy tank, the pressurizeable ballast water purging system and a first depth-control system and a second depth control system, the first depth-control system being controlled by hydrostatic pressures and housed within the buoyancy tank for transferring ballast water between the front and rear compartments, the transferable ballast water for selectively raising or lowering the front and rear ends, the second depth control system comprising an attaching device located at said center point of said center connecting means, said attaching device being adjustable up and down vertically by a device to adjust the leveraged drag forces to change the angle of attack of said pair of the rigidly attached hydrofoils to balance the hydrodynamic lifting forces to changes in the downward vector forcer caused by changes in drag force acting through a downward angled anchor line, said first and second depth control systems to combine the accuracy of said first depth control system with the speed and reliability of said second depth control systems, the pressurizeable ballast water purging system for controllably purging the front and rear compartments of ballast water for raising the power generating plant to a water surface.

2. The power generating plant of claim 1 wherein the pressurized ballast water purging system comprises a plurality of drain holes, a plurality of drain pipes, a plurality of water drain valves, a plurality of special valves that allow only the passage of liquids, and a master conduit for ejecting the purging ballast water, the drain pipes extending intermediate the master conduit and the drain holes, the water drain valves and the special valves being cooperatively associated with the drain pipes for allowing ballast water to pass there through, the master conduit for directing piped ballast water downward from the nose end of the buoyancy tank during recovery to raise said nose end to increase the hydrodynamic lifting force by increasing the angle of attack of the attached airfoil-shaped hydrofoils.

3. The power generating plant of claim 2 wherein the front and rear compartments and any intermediate compartments are separated by bulkheads that have superior located vent holes, all of said compartments being capable of being pressurized equally via the superior located vent holes and pressurizing means, the pressurized compartments for purging ballast water from the buoyancy tank.

4. The power generating plant of claim 1 comprising a power collection and transmission structure, the power collection and transmission structure being connected to the power generating structure for collecting and transmitting electrical current generated by the power generating structure.

5. The power generating plant of claim 1 wherein said first depth control system comprises a pressure switch and a dual-direction pipe system, the dual direction pipe system comprising a first direction pipe assembly and a second direction pipe assembly, the first direction pipe assembly for transferring ballast water from the font compartment to the rear compartment, the second direction pipe assembly for transferring ballast water from the rear compartment to the front compartment.

6. The power generating plant of claim 5 wherein the first direction pipe assembly comprises a first set of pipes, a first pump, and a first special check valve that will not allow water to flow in one direction and will not allow water to flow in the opposite direction when below a minimum pressure, the second direction pipe assembly comprising a second set of pipes, a second pump, and a second special check valve that will not allow water to flow in one direct and will not allow water to flow in the opposite direction when below a minimum pressure, the first and second special check valves for preventing ballast water siphoning, the first and second pumps being controlled by the pressure switch, the pressure switch being able to be actuated by hydrostatic water pressure, the first pump being operable for transferring ballast water from the front compartment to the rear compartment when the hydrostatic pressure goes above a first preset limit, the second pump being operable for transferring ballast water from the rear compartment to the front compartment when the hydrostatic pressures goes below a second preset limit.

* * * * *